United States Patent [19]

Hemsath

[11] Patent Number: 5,249,436
[45] Date of Patent: Oct. 5, 1993

[54] SIMPLIFIED, LOW COST ABSORPTION HEAT PUMP

[75] Inventor: Klaus H. Hemsath, Toledo, Ohio

[73] Assignee: Indugas, Inc., Toledo, Ohio

[21] Appl. No.: 865,953

[22] Filed: Apr. 9, 1992

[51] Int. Cl.$^5$ ............................................. F25B 15/00
[52] U.S. Cl. ...................................... 62/476; 62/477; 62/101
[58] Field of Search ................ 62/476, 477, 478, 479, 62/101, 106, 238.3; 165/104.21

[56] References Cited

U.S. PATENT DOCUMENTS

| | | | |
|---|---|---|---|
| 1,559,883 | 3/1923 | Karr . | |
| 2,259,024 | 10/1941 | Cleveland . | |
| 2,680,007 | 6/1954 | Arbuckle . | |
| 2,725,640 | 12/1955 | Voigtman . | |
| 2,908,485 | 11/1956 | Longwell . | |
| 3,269,458 | 10/1963 | Rogers . | |
| 3,328,896 | 7/1967 | Hanf . | |
| 3,338,477 | 8/1965 | McKinnie . | |
| 3,397,739 | 8/1968 | Miller . | |
| 3,842,596 | 10/1974 | Gray | 60/39.66 |
| 3,948,061 | 4/1976 | Kidwell | 62/499 |
| 3,973,552 | 8/1976 | Ervin | 126/271 |
| 3,981,702 | 9/1976 | Eskeli | 62/87 |
| 3,983,931 | 10/1976 | Whitehead | 165/88 |
| 3,997,376 | 6/1974 | Hemsath | 148/143 |
| 4,000,777 | 1/1977 | Laing | 165/86 |
| 4,000,778 | 1/1977 | Laing | 165/86 |
| 4,048,810 | 9/1977 | Zeilon | 62/101 |
| 4,064,932 | 12/1977 | Iriarte | 165/1 |
| 4,107,944 | 8/1978 | Eskeli | 62/401 |
| 4,187,688 | 2/1980 | Berg | 62/478 X |
| 4,206,745 | 6/1980 | Gilgen | 126/271.1 |
| 4,346,752 | 8/1982 | Kesten | 165/1 |
| 4,405,013 | 9/1983 | Okamoto | 165/86 |
| 4,413,670 | 11/1983 | Ritter | 165/1 |
| 4,532,778 | 8/1985 | Clark et al. | 62/477 |
| 4,574,874 | 3/1986 | Duran | 165/43 |
| 4,638,646 | 1/1987 | Koseki et al. | 62/478 |
| 4,823,864 | 4/1989 | Rockenfeller | 165/104.12 |

FOREIGN PATENT DOCUMENTS 2346649  10/1977  France .

OTHER PUBLICATIONS

Page 12–42 6th Edition Perry's Chem. Engr. Handbook.
Pages 2130–2132 Marks Handbook 6th Edition.

Primary Examiner—Albert J. Makay
Assistant Examiner—William C. Doerrler
Attorney, Agent, or Firm—Body, Vickers & Daniels

[57] ABSTRACT

A simplified, low cost absorption heat pump includes a single pressure vessel having first and second insulated compartments in unrestricted fluid communication with one another and containing, hermetically sealed, a working medium. A heat transfer ar is used to maintain the compartments at differential temperatures, but equal pressures so that the absorption cycle proceeds in a two-stage, batch mode, namely boiling of the working medium in the first compartment and simultaneous condensing in the second compartment during the first stage and evaporating in the second compartment and simultaneously absorbing in the first compartment during the second stage. The heat transfer arrangement then utilizes the heat given off or taken in during the absorption cycle for heating/air conditioning in a conventional manner. Periodically the working medium is rectified by a unique pump arrangement which transfers any working medium in the second compartment back to the first compartment after a predetermined number of cycles have been completed.

109 Claims, 13 Drawing Sheets

SIMPLIFIED, LOW COST ABSORPTION HEAT PUMP

This invention relates to a heat pump apparatus, method and system and more specifically to a heat pump utilizing an absorption heat cycle to effect heating and/or cooling.

The invention is particularly applicable to and will be described with specific reference to a low cost heat pump for effecting heating and/or cooling of structures such as residential homes, boats, trailers and the like. However, the invention disclosed herein has broader applications and may be used in industrial plants and processes to effect heating and/or cooling. The invention also has air conditioner application for automotive vehicles.

BACKGROUND OF THE INVENTION

A.) Scope—Definitions

This invention is limited to a heat pump performing an absorption heat cycle using a liquid working medium. For definitional purposes, the working medium comprises at least two substances. One of the substances must have and is defined herein to have a lower boiling temperature and thus a higher vapor pressure in the gaseous phase than the other liquid substance. ("Vapor pressure" or "saturated vapor pressure" is conventionally defined t mean that particular pressure corresponding to a particular temperature at which the substance as a gas is in equilibrium with the substance as a liquid. "Vapor" is conventionally defined as a gas which is at a temperature below its critical temperature and therefore can be liquefied by a suitable increase in pressure.) Typically, the working medium in an absorption refrigeration-heating cycle is most commonly ammonia and water. The ammonia has a lower boiling point and a higher vapor pressure than does water. Another example of a working medium is a solution of water and lithium bromide. Water has a lower boiling temperature and a higher vapor pressure in the gaseous phase for a specified temperature than does the rich solution of lithium bromide. Water in the water-lithium bromide solution functions as the equivalent of ammonia in the ammonia-water working medium. It is contemplated that all such liquid working mediums capable of use or heretofore used in an absorption heat cycle can be utilized in the heat pump of the present invention. In contrast, while some features of the invention may be conceptually applicable to gas-solid adsorbent systems, it is not contemplated that the invention, as defined and disclosed herein, is applicable to solid adsorbent systems for reasons which will be hereafter clarified To avoid any confusion in terminology, an absorption heat cycle is defined herein to mean one in which the following four steps or phases are sequentially performed:

a.) Boiling or generating a liquid solution in which vapor of the lower boiling point working medium is produced. This cycle step requires heat input and may be defined as endothermic.

b.) Condensing into liquid from its vapor the lower boiling point liquid substance. This cycle step liberates heat and may be viewed as exothermic.

c.) Evaporating the condensed liquid of the lower boiling point liquid substance in step (b) above. This step draws in heat and may be viewed as endothermic.

d.) Absorbing the vapor of the lower boiling point liquid substance into the higher boiling point liquid substance. This step gives off heat and may be viewed as exothermic.

The invention utilizes latent heat resulting from change of state between liquid and gas to effect refrigeration or heating in combination with gas absorption (solute, solvent) all of which are conventional concepts. Absorption is utilized so that the vapor pressure of the solution can be kept lower than the vapor pressure of the refrigerant to permit the process steps to occur as in any conventional absorption process.

B.) Commercial Applications

Liquid absorption cycles are traditionally utilized in commercial installations as a continuous process. The prior art process shown in FIG. 1 is described as a "Simplified Ammonia-Water Absorption Cycle" in the Sixth Edition, *Perry's Chemical Engineers' Handbook*, McGraw Hill (1987), at page 12–42 and is illustrated therein as FIG. 12–49.

In the FIG. 1 single stage continuous cycle, the evaporator is 1, the absorber is 2, the generator or boiler is 3 and the condenser is 4. Ammonia is the refrigerant and a diluted ammonia-water solution is the absorbent. In addition to the system requiring four fundamental and separate units there is significant additional hardware required for even the simplified FIG. 1 diagram which precludes, economically, the system from being used in a wide range of refrigeration and/or heating applications. The additional equipment includes a throttling valve 5 for emitting ammonia as a vapor into evaporator 1 which in turn must be in heat transfer contact with a heat transfer medium, typically brine 6, circulating therethrough, which then is used for cooling purposes. The "spent" ammonia vapor is then absorbed in a weak ammonia solution in absorber 2. The diluted ammonia-water solution is pumped to absorber 2 from generator or boiler 3. Absorber 2 is also provided with cooling water 7 to absorb heat produced within absorber 2 when ammonia vapor is bubbled through the weak ammonia-water solution to produce a strong ammonia-water solution. The strong ammonia-water solution is then pumped at high pressure by pump 8 to generator or boiler 3 and distillation column 9 In generator 3 waste heat at about 200°–400° F. at 10 heats the strong ammonia-water solution to produce vapors principally of ammonia but also containing water. This vapor stream is distilled or refined in distillation column 9 by contact with the strong ammonia-water solution from absorber 10 and also by contact of a portion of the ammonia from condenser 4 which is at a lower temperature to cool the vapors so that the lower boiling point vapor, water, condenses. The water or very weak water-ammonia solution condensed in distillation column 9 is then returned to generator 3. The ammonia vapor is condensed to liquid in condenser 4 with heat produced in condenser 4 absorbed by cooling water at 12. As shown in FIG. 1 a portion of the condensed ammonia is held in a receiver 13 and pumped at 14 back through distillation column 9 to further condense water from the ammonia-water vapor within distillation column 9. This simplified process disclosed in Perry's Handbook is typical of conventional absorption processes.

Heretofore, in all such commercial processes the ammonia-water vapor generated in the boiler passed through an "analyzer" and a "rectifier" to separate out or condense the water-vapor from the ammonia vapor. Thus, a typical absorption cycle process in addition to comprising four (generator, condenser, evaporator, absorber)separate units, also includes pumps for transporting the working medium at various pressures (high and low) through the system, several additional subsystem assemblies necessary to refine or purify the ammonia vapor content generated in the boiler or generator and heat transfer units for each of the four units. These requirements translate into hardware requirements which in turn make the application of an absorption heat cycle cost prohibitive when applied to a residential or commercial application and when contrasted to the cost of a conventional, mechanical vapor compression refrigeration cycle. Heretofore, the very nature of the process precluded its application in any small, low cost structure suitable for small, heating-cooling applications including not only, residential applications, but also automotive applications. On the other hand, it is well known that an absorption cycle uses considerably less mechanical power than a vapor compression cycle because liquids can be pumped with less energy than it costs to compress a gas and the durability of an absorption system, since a compressor is not required, is superior to conventional vapor compression systems.

C.) Literature Survey

Limiting discussion to refrigeration or heating systems applications applicable to residential heating and/or cooling, in general the following should be noted.

i) Adsorbents

Insofar as various features of the invention are concerned, adsorption systems use solids to absorb the refrigerant. However, because solids are troublesome to transfer, they are generally placed in stationary beds and continuous refrigeration is accomplished by installing duplicate beds of solids which serve intermittently as absorber and generator through a system of switching valves. The cycle consists simply of one bed acting as a generator while the other bed acts as an adsorber with temperature, pressure and valving being varied to cause gas flow and switching from one bed to the other. Because liquids and absorption of gas into liquid to produce a solution with desired vapor pressure is not involved there is no concern over the solution strength etc. which must be addressed in an absorption system. On the other hand, the heat availability of a gas-solid system, generally requires large amounts of solids precluding their application for residential heating and/or cooling. In addition, despite the non-volatility of the solids, there are nevertheless problems with solid particulates transferring between the beds which require filters etc.

Ritter U.S. Pat. No. 4,413,670 discloses a solid-gas adsorption system for residential heating and/or cooling. In Ritter, both beds have identical metal hydrides and a pressure variation between the beds, caused either mechanically or thermally, is used to pump hydrogen so that one bed acts as a generator while the other bed acts as an adsorber. As noted above solid bed adsorbent systems need a large mass of material and their weight and attendant size of heat transfer equipment preclude application as a heat pump for residential and commercial use. In Ritter, a very active metal hydride is used and the system cycled fairly quickly to reduce the bed size. As the cycle time reduces, the quiescent nature of the beds is disturbed and entrainment becomes a concern, requiring filters, periodic maintenance, etc. In Ritter spiral shaped inserts or small size pipes are used between the beds to prevent fine grain metal powder from precipitating from one bed to the other. This requires periodic maintenances and establishes a pressure differential between the beds.

ii) Absorption Systems

Within the absorption residential or commercial heating and/or cooling art, Gilgen U.S. Pat. No. 4,206,745 discloses a solar operated absorption heat pump. In Gilgen's solar operated heat pump, one uninsulated tank is placed outside the structure to be heated or cooled and acts as a "heat sink" while the other tank is insulated and contains heating coils connected to a solar collector. During the day, heat from the solar collector makes the insulated tank function as a generator and creates a pressure differential between the insulated and uninsulated tanks whereby some ammonia vapor from the insulated boiler tank is bubbled to the uninsulated tank and condensed therein to make a strong ammonia-water solution. At night, temperature change causes ammonia to evaporate from the liquid solution within the uninsulated tank and develop a pressure in the uninsulated tank greater than that in the insulated tank. Pressure differential between the tanks causes ammonia vapor to migrate through one-way valves to the insulated tank where it is absorbed therein giving heat to the coils for night time heating of the dwelling. Adjustment settings permit both tanks to be maintained at the same liquid level. Thus Gilgen shows an absorption system utilizing the differences between the strong and weak or strong and diluted water-ammonia solutions to generate some heating or cooling on an a.m.-p.m. (12 hr.) cycle. Actually the steps of absorption, generating, condensing and evaporating occur on a 24 hour cycle basis. Because Gilgen's system operates on the differences in concentration in the ammonia-water solution, the efficiency of the system must be less than that of the FIG. 1 commercial systems in use today. Further, the cycle is on an a.m.-p.m. basis which renders the unit unsuitable as the primary heating-cooling mechanism for residential use. Further, the system is driven by valve pressure differential between the separate tanks in a manner not dissimilar to Ritter U.S. Pat. No. 4,413,670 with Gilgen's tank or "bed" level adjusted to equal liquid levels.

iii) Vapor Compression Systems

With respect to refrigeration systems operating on a vapor-compression cycle, Karr U.S. Pat. No. 1,559,883 shows a dumb-bell shaped, hermetically sealed container with one end, the evaporator, contained in an enclosure partially filled with brine and the other end of the container, the condenser, mounted outside and carrying therein the compressor and the expansion valve. The expansion valve permits the liquid refrigerant to expand as a gas through the interconnecting tube between the dumb-bell ends into the dumb-bell end which functions as the evaporator. The vapor is drawn back through the tube into the condenser where it is again compressed to a liquid by a compressor therein which operates when the dumb-bell is rotated. The dumb-bell is also rotated to enhance heat transfer of the gases contained with the dumb-bell. The condenser has fins protruding therefrom which act as paddles to direct air flow against the exterior surface of the condenser. The dumb-bell arrangement, like Ritter, shows a structure not totally dissimilar to my structure. However, the principles are entirely different.

In summary, while the three cited literature examples might show, after viewing my invention, some concepts partially related to my invention, until my invention there has not been any low cost, absorption system (equivalent to the cost of a vapor compression system) suitable for residential and/or commercial heating-cooling applications.

SUMMARY OF THE INVENTION

Accordingly, it is a principal object of the invention to provide a simple, low cost absorption system suitable for residential heating-cooling applications.

This object along with other features of the invention is achieved in a system, method and/or apparatus in which an absorption heat pump is provided which uses a working medium of at least two substances, one substance having a low boiling temperature and the other a higher boiling temperature. The absorption cycle performed by the heat pump includes the conventional steps of evaporation, absorption, boiling or generating and condensing performed in a cyclical, progressive step-wise manner. The heat pump essentially comprises a single, unitary pressure vessel in which the working medium is disposed in a hermetically sealed manner so that the heat pump is totally benign to the environment in contrast to fluorocarbon leakage and the like inherently possible in many conventional, compressed vapor refrigeration systems. The pressure vessel has two compartments which are in fluid communication with one another. In accordance with one aspect of the invention, the compartments are in fluid communication with each other without restriction so that both compartments are virtually or essentially at the same pressure (at least for the pressures which the pressure vessel is subjected to) and the compartments are generally thermally insulated from one another. A heat transfer mechanism is provided for cyclically varying the temperature of each compartment to permit the absorption cycle to proceed in a two-stage, batch processing mode which can be performed by a single vessel permitting numerous applications of my absorbent heat pump to installations which typically precluded absorption heat processes. Temperature differential between the compartments which are at about equal pressure establishes an unequilibrium condition between the compartments and drives the working medium to change phase and distribute itself between the compartments in an effort to establish thermal equilibrium between the compartments. The phase change involves latent heat which is then utilized, as in all absorption systems in heating and/or cooling. More specifically, by controlling the temperature of the compartments, it is possible to cause vaporization of the low boiling point substance in the working medium in the first chamber while simultaneously causing condensation of the low boiling point vapor which has migrated because of a very slight pressure differential into the second chamber and condensation of the low boiling point substance continues until the low boiling point substance in liquid form in the second compartment is in vapor pressure equilibrium with the working medium in the first compartment at the different compartment temperatures. The heat transfer mechanism then cyclically changes the temperature of the first and second compartments to simultaneously cause evaporation of the low boiling point liquid in the second compartment and absorption of the low boiling point substance vapor into the higher boiling substance of the first compartment, the process continuing until vapor pressure equilibrium is obtained between the first and second compartments so that the entire process is performed in a two-stage cycle in one hermetically sealed vessel by simply varying the temperatures of the first and second compartments.

Vapor of the high boiling point working substance will evolve and migrate from the first compartment to the second compartment and in time, the second compartment will acquire a sufficient quantity of high boiling point substance whereby both compartments will be in vapor pressure equilibrium with one another at the cycle temperature differentials. In accordance then with another important and significant feature of the invention, the invention provides a rectification mechanism, in various forms, which, after performing a predetermined number of cycles, periodically withdraws and transfers any liquid from the second compartment to the first compartment. Periodic rectification of the pressure vessel after a predetermined number of cycles permits the pressure vessel to effect an absorption cycle in the two-stage batch mode at consistently high efficiencies by maintaining the high boiling point substance in the first compartment so that the second compartment substantially contains, if anything, only various amounts of the low boiling point substance in vapor or liquid form.

In accordance with a particularly important feature of the invention the vessel is constructed in a configuration best described as a dumb-bell with a connecting tube connecting the dumb-bell spheres or cylinders and which is sufficiently sized to maintain the first and second compartments at virtually equal pressure to permit heat transfer equilibrium conditions to not only drive the cycle but to also achieve fast and efficient transfer of the low boiling liquid to minimize cycle time of the process. Each compartment is individually positioned within a container and each container is filled with a heat transfer medium at a particular temperature. Preferably, the heat transfer medium is a hydronic liquid and the dumb-bell vessel rotates about its longitudinal tubular axis to achieve very high heat transfer rates between liquids within and outside each compartment in a manner which will be described hereafter.

Importantly and in accordance with a specific feature of the invention rotation of the dumb-bell shape pressure vessel achieves very high absorption rates of the low boiling point substance into the high boiling point substance without utilizing expensive water gas contact mechanisms such as bubbling plates, water sprays, film contact, or other arrangements depending on pressure differentials. Thus absorption, itself, is achieved by the invention and absorption in combination with high heat transfer coefficients.

In accordance with a still very significant and important feature of the invention, an open ended transfer tube having one end opening to the first compartment extends along the axis of the vessel's rotation and radially extends into the second compartment to a position adjacent the interior surface of the second compartment whereby high speed rotation of the vessel, during the absorption cycle, develops centrifugal force preventing any working medium in the second compartment from travelling through the transfer tube to the first compartment while low speed rotation of the vessel permits liquid in the second compartment to enter the open end of the transfer tube therein as the compartment rotates relative to the liquid and develop, by gravity, a head pressure within the transfer tube sufficient to cause liquid scooped into the tube to travel and be deposited into the first chamber. A timer mechanism causes low speed rotation to occur after a predetermined number of absorption cycles so that the heat pump of the present invention continuously operates without the need of analyzers or transducers to adjust and maintain the ammonia-water concentration.

In accordance with yet another aspect of the invention, temperature of the heat transfer medium is maintained at three discrete ranges, namely, a boiling range, an ambient range, and a cooling range. The heat transfer medium is easily cycled among the three temperature ranges to cause the absorption cycle to occur without necessity for any costly or extensive system components.

In accordance with still a more specific feature of the invention, three separate heat transfer media are utilized, namely, i) a first heat transfer medium at the boiling temperature range preferably developed by a residential hot water heater or furnace; ii) a second heat transfer medium in contact with air at ambient temperature through the heat exchanger, typically a heat exchanger situated outside a dwelling; and iii) a third heat transfer medium in contact with an in-duct heat exchanger, preferably the "A" coil heat exchanger typically installed in an air conditioning unit of the dwelling's furnace, so that the system on a component by component basis is equivalent to vapor compression air conditioning units. The heat pump operates in the air conditioning mode in the first stage of the process by simultaneously circulating the first heat transfer medium in the first container and the second heat transfer medium in the second container and then switching the second heat transfer medium to the first container while circulating the third heat transfer medium in the second container. Heating is accomplished by simply switching the in-duct heat exchanger to be in fluid communication with the second heat transfer medium and the external heat exchanger to be in fluid communication with the third heat transfer medium.

In accordance with a still further aspect of the invention, continuous heating and/or cooling occurs throughout the cycle by providing a second pressure vessel and four way valves to constantly use and cycle the first, second and third heat transfer medium to both vessels which operate in staged relationship to one another.

It is thus an object of the invention to provide a low cost absorption heat pump.

It is another object of the invention to provide an absorption heat pump which is environmentally clean.

It is yet another object of the invention to provide an absorption heat pump which uses only one vessel to effect all four stages of the absorption cycle.

It is yet another object of the invention to provide an absorption system which operates in a two-stage batch mode for efficient operation.

It is yet another object of the invention to provide an absorption heat pump, system and method in which the absorption cycle proceeds through all four phases without any need to adjust the working medium concentration during the cycle and the working medium concentration is periodically adjusted upon completion of the cycle to produce a simple system.

Still another object of the invention is to provide a heat pump, system, method and apparatus which is inherently more efficient than conventional absorption systems in that pumps are not needed to cause the working medium to circulate.

Yet another object of the invention is to provide a heat absorption pump, system, method and apparatus which obviates the need to analyze and/or strengthen the working medium concentration during the cycle thus obviating the need and the cost of any systems or equipment to perform such functions.

It is still yet another object of the invention to provide a heat pump system, apparatus and/or method which operates solely on the basis of thermal equilibria to cause the absorption cycle to occur.

It is still yet another object of the invention to provide an absorption heat pump, system, method and/or apparatus which obviates any need for pumps, suction or pressure, to move the working medium.

It is still yet another object of the invention to provide in an absorption heat pump, a mechanism for improved heat transfer with a working medium while also achieving ready solubility and fast mass transfer of the substances within the working medium to produce a smaller heat pump than what otherwise would be required.

Yet another object of the invention is to provide an absorption heat pump which can function as an air conditioner in an automobile or other application where the motor driving the vehicle provides the power for heating/air conditioning.

Yet another object of the invention is to provide an absorption heat pump which can be used in mobile type applications like trucks, boats, buses, and other recreational vehicles which currently use a "stand alone" generator for heating/air conditioning.

A still further object of the invention is to provide an absorption heat pump which has a similar number of components as a heat pump operating on a mechanical vapor compression cycle which is non-polluting to the environment.

Still yet another object of the invention is to provide an absorption heat pump which can be readily retrofitted into existing residential heating systems using portions of an existing mechanical vapor compression refrigeration system and more specifically by utilizing existing heat exchangers, ducting and controls in such systems.

Still yet another obJect of the invention is to provide a simple valving system for heating and/or cooling residential and/or commercial installations which permit installation of the absorption system at costs equivalent or less than that of mechanical vapor compression systems.

A still further object of the invention is to provide an absorption heat pump system which in it's air conditioning or heating mode also generates sufficient heat to operate a hot water heater in a residential application.

A very specific object of the invention is to provide in a batch absorption heat pump for residential application in which outside temperature establishes an ambient system temperature and method of operating same, a preferred ammonia water composition (typically 40-60% ammonia by weight) at which system boiler temperature (typically less than about 250° F.) can be minimized (and consequently system pressure) to operate at high thermal efficiencies.

Still yet another specific object is to provide a batch mode absorption heat pump operated at predetermined temperature ranges with a predetermined working medium composition which permits the heat pump to complete a predetermined number or range of finite cycles before working medium rectification is required.

Still yet another specific and somewhat diverse object of the invention is to provide an improved four way valve for use in a heating/air conditioning application of the present invention.

A still further object of the invention is to provide an absorption heat pump which has a high COP (co-efficient of performance).

Still further advantages, objects and features of the invention will become apparent to those of ordinary skill in the art upon a reading and understanding of the following description of the preferred embodiment.

BRIEF DESCRIPTION OF THE DRAWINGS

The invention may take form in certain parts and arrangement of parts, a preferred embodiment of which will be described in detail herein and illustrated in the accompanying drawings which form a part hereof and wherein:

FIG. 10 A is the schematic piping circuit of FIG. 10 but with valving switched to show the invention in its next stage of the absorption cycle;

FIG. 12 A is the schematic piping diagram of FIG. 10 but with valving cycled to show the invention in its second stage of the absorption cycle in its summer cooling mode;

FIG. 12 B is the schematic diagram of FIGS. 10 and 10 A but with valving cycled to show the invention in its first stage of the absorption cycle in its winter heating mode;

FIG. 12 C is the schematic of FIGS. 10, 10 A, and 10 B but with valving cycled to show the invention in its second stage of the absorption cycle in its winter heating mode;

DETAILED DESCRIPTION OF THE INVENTION

Figure 2:
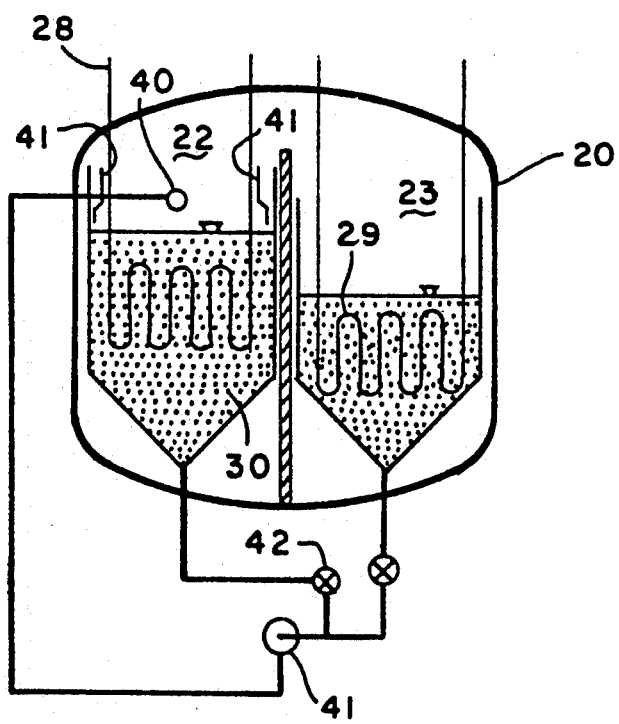
FIG. 2 is a schematic section plan view of an alternative embodiment of the present invention.
Figure 3:
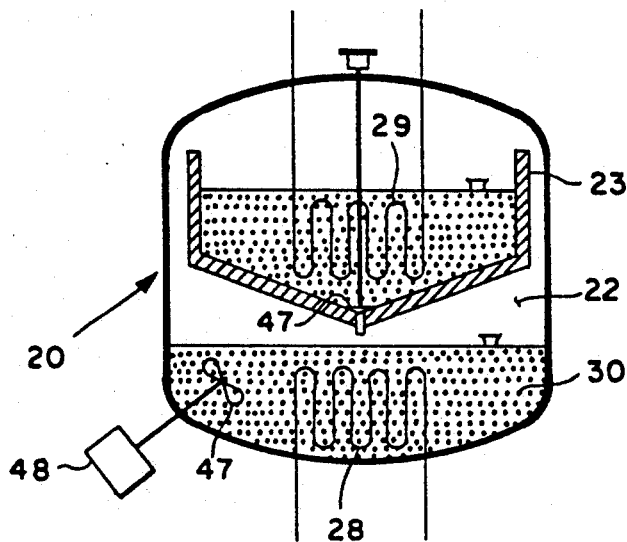
FIG. 3 is a schematic plan section view of another alternative embodiment of the present invention.

Referring now to the drawings wherein the showings are for the purpose of illustrating the preferred and alternative embodiments of the invention only and not for the purpose of limiting same, there is shown in FIG. 2 a pressure vessel 20 and similarly a pressure vessel 20 is shown in FIG. 3. For ease in best explaining how the invention works, alternative embodiments of FIGS. 2 and 3 will be explained first prior to explaining the preferred embodiment and additional features of the invention present in the preferred embodiment. Throughout the specification like reference numerals will apply to like parts and components which operate for the same function for the embodiments illustrated herein.

Pressure vessel 20 may be of any configuration or shape so long as it is able to be hermetically sealed at the pressures at which the invention is operated typically 50-300 psig and so long as the vessel can be constructed to have a first compartment 22 and a second compartment 23 with fluid communication between first and second compartments 22, 23 established in such a manner that there is no restriction resulting in any significant pressure drop therebetween at the pressures at which the vessel 20 is subjected. Preferably, vessel 20 would be constructed in a spherical shape or cylindrical shape with spherical ends, the later shape being utilized in all of the embodiments illustrated herein Thus, the invention is viewed as including a single pressure vessel containing first and second compartments which are in unrestricted fluid communication with one another so that the pressure of both compartments within pressure vessel 20 is substantially always equal. Alternatively, the invention could be stated as including two pressure vessels 20 in unrestricted fluid communication with one another so that the pressures of both vessels are always equal. For ease in explanation, the invention is being defined as one pressure vessel 20 having two compartments, it being understood that two pressure vessels having single compartments in unrestricted fluid communication with one another are covered by the same terminology.

The next requirement or element of the invention is that first compartment 22 be thermally insulated from second compartment 23. In the alternative embodiment disclosed in FIG. 2 thermal insulation is achieved by an insulated wall 25 separating first compartment 22 from second compartment 23. In the alternative embodiment disclosed in FIG. 3 thermal insulation is achieved by forming second compartment 23 out of an insulated chamber wall 26 which chamber wall 26 defines second compartment 23 and which is vertically suspended above first compartment 22.

The next element of the invention is some form of a heat transfer mechanism which is used to keep or maintain first and second compartments 22, 23 at different temperatures. In the alternative embodiments of FIGS. 2 and 3, this heat transfer mechanism can take the form of a first heat exchanger or coil 28 in first compartment 22 and a second heat exchanger or coil 29 in second compartment 23. A heat transfer medium is circulated through first and second coils 28, 29 to place first and second compartments 22, 23 at predetermined temperatures and compartments 22, 23 are maintained at such temperatures vis-a-vis the insulation previously described.

Finally, a rectification mechanism discussed in the next section is provided for continuous operation of the heat pump. Also, there is some form of a mass transfer mechanism which is used to accelerate the absorption of the high vapor pressure component of the working medium into the "weak" working medium in compartment 22.

With reference to FIGS. 2 and 3 which are intended for large scale industrial type applications and in order for the absorption step to occur efficiently, it is possible to provide a water spray manifold 40 in first compartment 22 and a hermetically sealed water pump 41 controlled by valve 42 may be used to generate a water spray in first compartment 22 during the absorption phase. The water spray increases the water gas surface contact area to allow better heat transfer and faster absorption of ammonia vapor into working medium 30. This water manifold concept is conventional within the art. Water manifold 40, for drawing purposes, is disclosed only for FIG. 2 although it can and is contemplated to be used for pressure vessel 20 in FIG. 3. Alternatively a water film generator, schematically shown by reference numeral 41 in FIG. 2 may be employed. Film generator 41 comprises a baffle through which "weak aqua" by pump 41 is pumped to flow down the sides of first compartment 22 thus increasing the surface liquid area to gas contact area to increase absorption. Still alternatively a stirrer or rotary wiper schematically shown by reference numeral 47 driven by motor 48 may be used to accelerate mass transfer between the vapor of the high vapor pressure liquid and the "weak" solution in first compartment 22. In the preferred embodiment of the invention a unique and far more efficient concept is utilized to effect mass transfer and/or absorption of the vapor of the low boiling point liquid into the "weak" solution.

SYSTEM DESCRIPTION

As thus far described the batch mode heat pump cycle of the invention can be explained. At the start of the cycle, within first compartment 22 is a working liquid medium 30 comprised of at least two substances, one having a lower boiling point and consequently a higher vapor pressure than the other. For consistency in terminology working medium refers to both substances while terminology such as "low boiling substance", "high boiling substance", "low vapor pressure substance", or "high vapor pressure substance" refers to the individual substances which make up working medium 30. "Substance" is used as opposed to "liquids" to cover those solutions such as lithium bromide, which is normally a solid, but which becomes a liquid when immersed in water. The distinction then between the absorption system of the invention and an adsorption system is that working medium 30 is a liquid. Also throughout the specification, the low boiling or higher vapor pressure substance will be ammonia i.e. the refrigerant, while the high boiling or lower vapor pressure substance will be water. Countless other solutions, such as lithium bromide and water with water as the refrigerant are possible.

For explanatory purposes, at the start of the cycle it can be assumed that within first compartment 22 is working medium 30 in liquid form with the low boiling point substance comprising some predetermined percentage of the high boiling point substance and the total volume of the working medium 30 comprising some predetermined percentage of the volume of first compartment 22. At the onset of the cycle there is no working liquid medium 30 nor high or low boiling point substances within second compartment 23. Second compartment 23 is virtually empty. A heat transfer medium at some elevated predetermined temperature is caused to flow through first heat exchanger 28 and as a result thereof raises the temperature of first compartment 22 to some higher temperature. Eventually, first compartment 22 will be at the temperature of heat transfer medium circulated within first heat exchanger 28, although the process will probably be cycled or switched to it's second stage before that time. As the temperature in first compartment 22 increases, the low boiling point liquid substance i.e. the ammonia will vaporize. The act of producing vapor in first compartment 22 is defined as the boiling step and may be viewed as equivalent to producing the "strong aqua" produced in generator 3 and distillation column 9 of the prior art. Simultaneously within second compartment 23 a second heat transfer medium at a predetermined temperature, typically ambient temperature, is being circulated through second heat exchange coil 29 in second compartment 23 and this maintains second compartment 23 at the temperature of the second heat transfer medium. The result is that both compartments are at the same pressure but at differential temperatures and that portion of the low boiling point liquid which is vaporized, i.e. a gas vapor, will migrate to or diffuse or distribute itself within first and second compartments 22, 23 in such a manner as to establish thermodynamic equilibrium between first and second compartments 22, 23. The pressure within vessel 20 is in good part determined by the temperature and composition of working medium 30 in the lower temperature compartment which will always be second compartment 23.

At some point the valving of the heat transfer medium is switched. Specifically heat transfer medium at the first high temperature in first heat exchanger 28 is replaced by heat transfer medium at a lower temperature, preferably the second heat transfer medium at ambient. Simultaneously heat transfer medium at a third temperature, preferably lower than ambient temperature, replaces the second ambient temperature medium in second heat exchanger 29 in second compartment 29. In this second stage of the absorption process, temperature of first compartment 22 approaches ambient and temperature of second compartment 23 approaches the temperature of the third heat transfer medium which is preferably less than the ambient temperature of second heat transfer medium. At stage II temperatures, low boiling liquid evaporates or boils. Latent heat of evoporation is supplied from third heat transfer medium which is cooled and is then used as the refrigeration medium in the cooling mode. Simultaneously low boiling liquid vapor migrates or moves from second compartment 23 to first compartment 22 where it contacts and is absorbed, as a liquid, into the high boiling point liquid. As the low boiling liquid vapor is absorbed into the high boiling liquid, heat is generated which is removed by second heat transfer medium.

Figure 13:
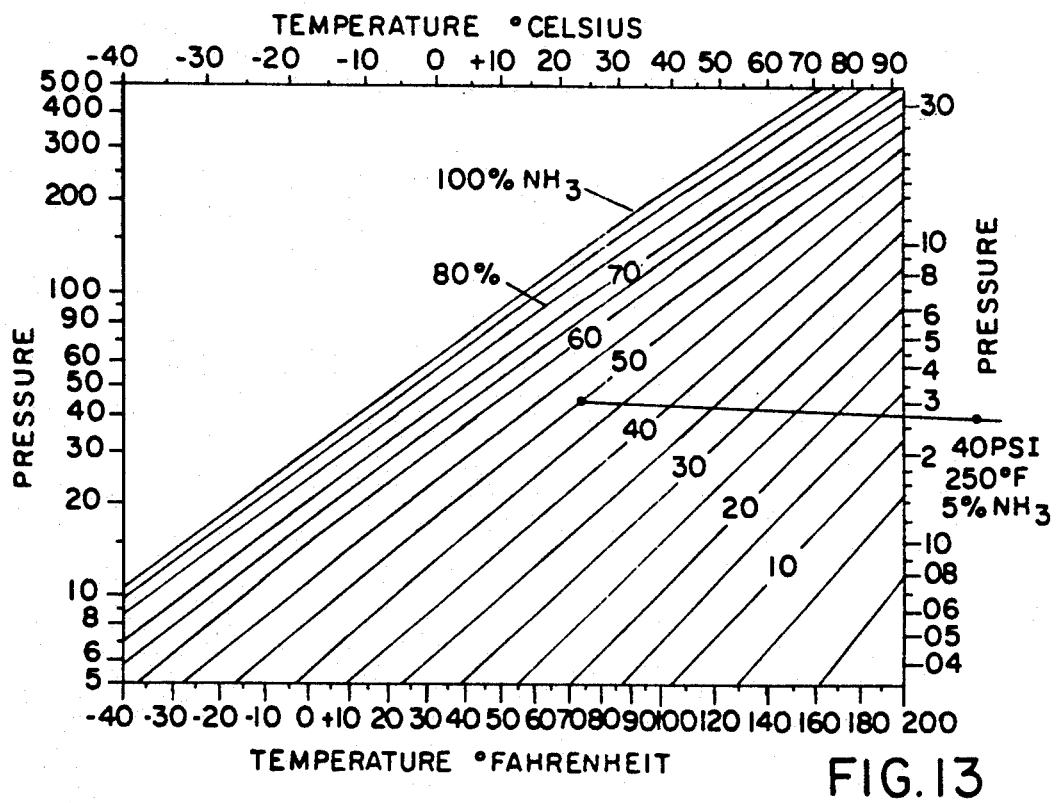
FIG. 13 is a graph of several typical partial vapor pressure curves indicative of various concentrations of the working medium pair, water (aqua) and ammonia.
Figure 14:
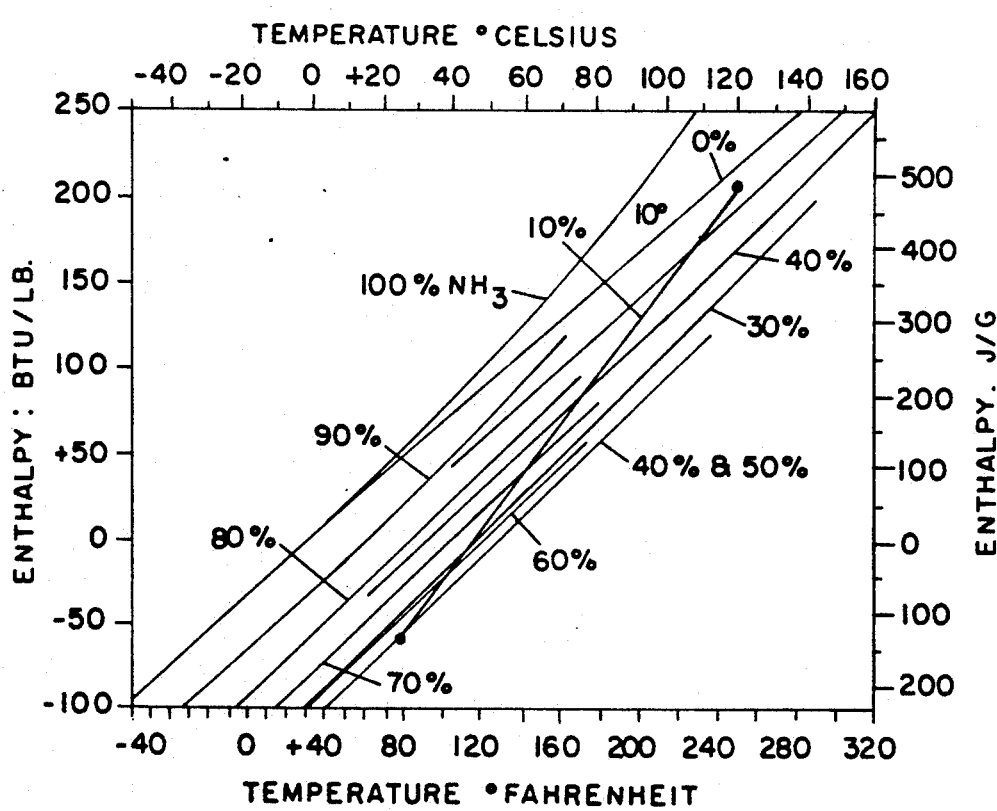
FIG. 14 is a graph of the liquid enthalpies of aqua-ammonia solutions with the boiling-absorption cycle segment drawn in and cycling between 80° F. and 200° F. in the figure.
Figure 15:
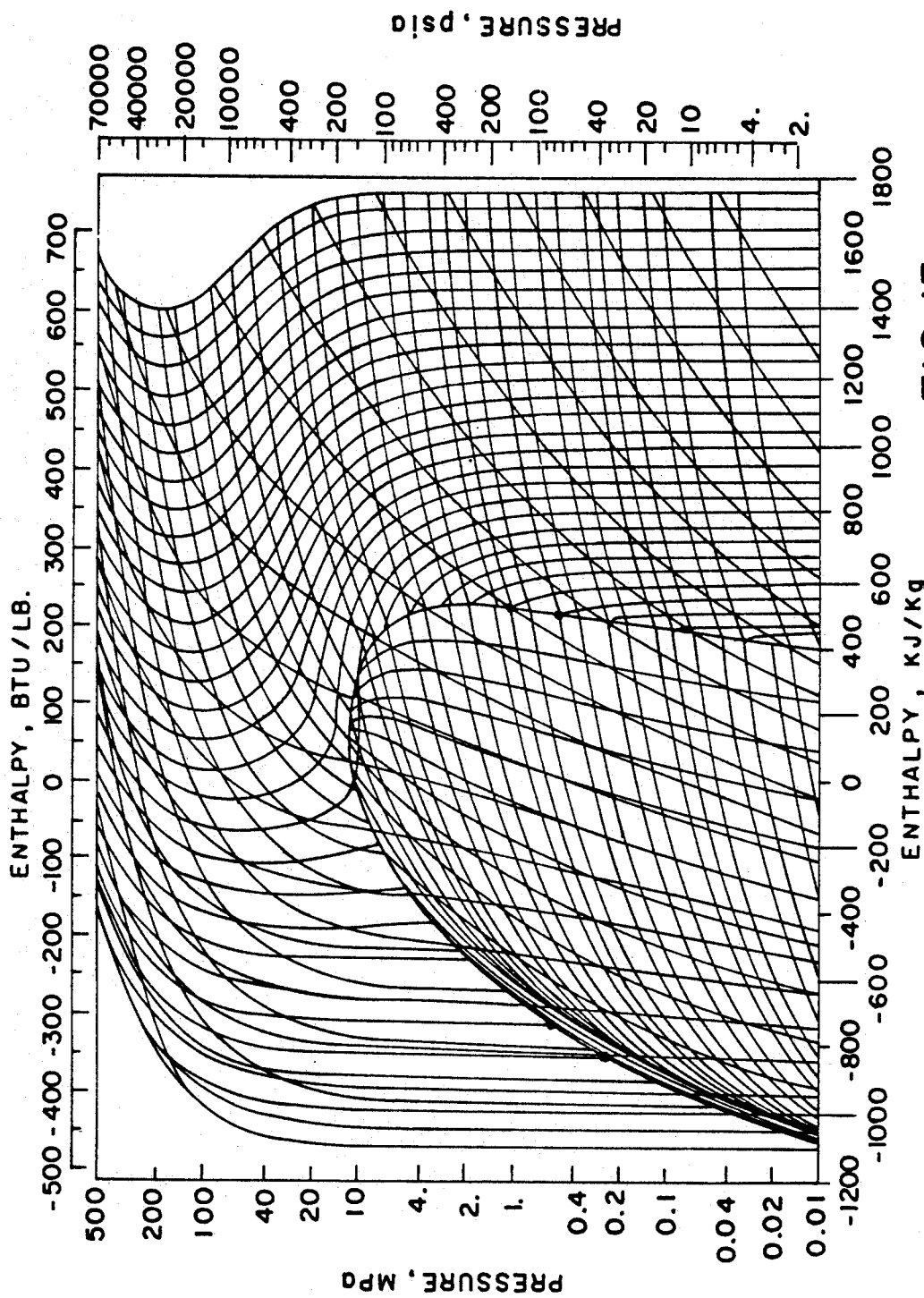
FIG. 15 is an enthalpy-log pressure diagram for pure ammonia with the condensation-evaporation cycle segment drawn for a temperature of the cooling liquid at approximately 40° F. or 280° K and the ammonia being condensed at 80° F. or 300° K.

The process is now explained in terms of several thermodynamic diagrams that are commonly used to determine properties at the selected process conditions. It is to be understood that FIGS. 13, 14, and 15 are conventional diagrams which have been simply marked to show where the process of the present invention is practiced. The diagrams are conventional. For instance, FIG. 15 is copyrighted by the American Society of Heating, Refrigerating and Air-Conditioning Engineers and has been widely publicized.

In FIG. 13 is a graph relating pressure, temperature, and composition of the ammonia-water solution. The vapor pressure is shown on a logarithmic scale, the temperatures are shown on an inverse scale and the curves of equal concentrations now appear as virtually straight lines. This type of graph is suited for showing the changes that occur in a solution as the result of heating the solution and of evaporating the ammonia. As the temperature increases, the ammonia vapor increases the pressure above the solution. If this ammonia is withdrawn from the high temperature compartment (as practiced in the batch absorption process) and is condensed in its pure form in the second compartment the concentration of ammonia in the first compartment decreases, the pressure above the solution declines, and the temperature increases. According to this chart a solution having an initial composition of 50% weight of ammonia can be heated to 250° F. at which temperature its concentration will decrease to 5% weight ammonia when the pressure is maintained at 40 psi. This is shown by the line drawn in FIG. 13, which indicates how the process proceeds in first compartment 22, which is at ambient temperature with a 50-50 percentage by weight ammonia-water composition and a pressure slightly in excess of 40 psia. The composition in first compartment 22 when heated during the boiling phase to a temperature of 250° F. reduces the ammonia concentration of the working medium to about 5% while maintaining pressure somewhat constant at about 40 psi.

In FIG. 14 the exact same change of state is shown. Again the change of state is for the working medium of a 50% ammonia concentration at ambient temperature to a 5% ammonia concentration at 250° F., which is present in first compartment 22 at the completion of the boiling phase and is shown by the line drawn on FIG. 14. In this graph the enthalpy, the heat content of the solution, is depicted. It can be seen that a considerable amount of heat in the amount of approximately 270 Btu/pound must be transferred to the solution to affect this change in concentration from 50 to 5 weight percent and from 80° F. to 250° F. It should be remembered that FIGS. 13 and 14 only show the changes of state for the solution inside the boiler or absorption vessel compartment. The changes of state for the ammonia cannot readily be shown in this graph. FIG. 15 is better suited for this purpose.

In FIG. 15 a diagram for a single substance, pure ammonia, is shown in the more familiar form of logarithmic pressure versus linear enthalpy. Temperatures (in degree Kelvin) are shown as parameters as are entropies. In this diagram the change of state for the ammonia in the second vessel, the condenser and evaporator, is shown. That is the two points drawn on the saturated liquid line show the pressure variation in second compartment 23 during the condensation phase and the two points drawn on the saturated vapor line for pure ammonia show the pressure variation in second compartment 23 during the evaporation phase. Pure saturated ammonia vapor is condensed at a temperature of 80° F. or 300° K at which temperature the ammonia vapor has an enthalpy of 225 Btu/pound. As liquid continues to be formed it eventually forms a liquid pool with a much smaller enthalpy of approximately −275 Btu/pound. The pressure of the ammonia vapor at this temperature of 80° F. is approximately 140 psia which has actually been observed as the usual maximum measured pressure in both pressure vessels in most of our tests. As the liquid is evaporated the liquid temperature is reduced and its temperature decreases along the saturated liquid line in the diagram. With the temperature decrease in the second vessel the pressure decreases and with it the pressure in the first vessel has to decrease also. Dependent on ambient temperature level these values can be approaching the range of atmospheric pressures or below. Because of the hermetic sealing of the pressure vessel such excursions below atmospheric pressure do not create leakage problems.

The very low observed system pressures which are determined by the condensing temperature in the second vessel contribute significantly to the low cost design of the batch heat pump appliance.

While there are no serious technical problems in going to very high boiler temperatures in the range of 250° F. to 325° F. such measure does not result in actual benefits but rather creates several problems. The more severe problem is the increase of water pressure (not ammonia pressure) and the resulting reduction in thermal cycle efficiency. The problem of creating high pressures is not acute with the batch absorption heat pump since maximum system pressure is determined not by the boiler temperature but by the condenser temperature. This statement presupposes that the ratio of heat transfer surfaces is in the range of unity.

The most limiting conditions are, obviously, the temperature of the heat transfer medium at ambient temperature and the sealed-in composition of the mixture. At a 78° F. ambient temperature a final ammonia pressure of approximately 140 psia will be established in the condenser vessel. If this temperature is increased, as will be the case on hot days, this pressure will increase. At 100° F. the pressure will go to 200 psia. Together with the composition of the solution this temperature will also determine the final temperature inside the evaporator. With an ammonia-water solution composition of 0.8 pound of ammonia in one pound of water (44.4 weight percent) and an absorber temperature of 78° F. one can create an ammonia pressure of 20 psia and at 100° F. this pressure will be 38 psia. Such pressures in the evaporator will in turn create an evaporator temperature of −2° F. or 22° F. respectively. If we want to control the cooling medium temperature to only 40° F. to obtain simultaneous air moisture and air temperature conditioning one can select higher ammonia concentrations approaching 55% to 60% by weight. These higher ammonia concentrations increase thermal efficiency of the process because the losses imposed by heating the water and part of the associated equipment mass become comparatively smaller.

It, therefore, appears that a range of concentrations between 40% and 55% by weight of ammonia in water is best suited for this batch process and that maximum pressures between 140 and 250 psia must be expected with the range of ambient temperature media discussed. In this batch absorption heat pump the boiler temperature can be increased to very high values without effect on the maximum system pressure provided, however, that the design is along the principles and respective dimensions shown in FIGS. 5 and 8.

The system has been described thus far with reference to an assumed operation so that its batch mode of operation can be readily understood. Those skilled in the art will readily recognize that irrespective of how large the opening or passage between first and second compartments 22, 23 is, some pressure differential must exist between first and second compartments 22, 23 so that the ammonia is transferred between first and second compartments 22, 23. Furthermore, the larger the opening, the less the pressure differential and the faster the time for the ammonia to travel from first to second compartments 22, 23. It is one of the objectives of the invention to move the ammonia as quickly as possible between the compartments in as short a cycle as possible. Thus the fluid communication is defined to be unrestricted so that the pressures of both compartments 22, 23 are virtually the same. In point of fact there has to be and must be some pressure differential, negligible when compared to the overall pressure of the compartments, which must exist. In fact depending on how the thermal cycle lines are constructed (FIG. 14) it is possible to vary the pressure etc., so long as the pressure for the concentration of the working medium solution still permits the phase transformation to occur, the trade-off being the cycle time. Similarly, the preceding discussion has discussed the process by neglecting the water being driven off. Those skilled in the art will recognize that depending on the concentration of the ammonia in the ammonia-water solution, some fractional percentage of water will be vaporized along with the ammonia with the fractional percentage of the water vapor increasing as the percentage of ammonia in the ammonia-water solution in first compartment 22 weakens. In fact it is believed that recognizing this fact has heretofore taught those skilled in the art not to use a batch cycle for absorption processes. That is, as the working medium weakens in the ammonia water solution, more water will continue to be driven to the second compartment. While some of this water in the evaporation stage of the cycle will be vaporized along with the ammonia and returned to the first compartment, the absorption phase driving the ammonia to liquefy is not present for the water. Thus the water will tend to remain in second compartment 23. This will shift point C in FIG. 14 to one of the other ammonia-water vapor pressure curves and depending on how much low boiling point liquid is collected in second compartment 23, the process will slow down, stall or stop. Only a minor change of state will occur with vastly reduced cooling or heating effects. Thus, at the point where the prior art cited above established a "batch" processing mode with equal levels of working medium in both compartments, the present invention slows down and becomes thermally inefficient and may be considered inoperative.

In practice lock-up has been observed. It has been observed that, if for nothing more than inherent variations in the temperature of the heat transfer mediums during the boiling phase of the first stage of the cycle, some vapor of the high boiling point liquid substance will be generated along with the vapor of the low boiling point liquid. The high boiling point vapor will migrate to second compartment 23 whereat it will condense and the high boiling point liquid will not evaporate in the evaporation phase of the second stage of the cycle. Thus, after the first cycle is completed some water will be present in second compartment 23. When the temperature differentials between first and second compartments 22, 23 is again established in the next successive cycle the compartments will not be disorientated in state to the extent they were in the first cycle and equilibrium between the two compartments will tend to occur sooner. During the second cycle more water will be deposited in second compartment 23 and this in turn will make the third cycle less efficient than the second cycle which in turn was less efficient than the first cycle. Eventually, a sufficient amount of high boiling point liquid is deposited in second compartment 23 which, for the temperature differentials selected, will result in some ammonia-water ratio between the first and second compartments such that no or very little transfer of ammonia vapor occurs from first compartment 22 to second compartment 23 in the first stage or evaporation of ammonia from second compartment 23 to first compartment 22 occurs in the second stage. When this occurs the heat pump can be considered inoperative. What has been determined however is that a number of batch absorption cycles can be conducted at relatively good efficiencies before "lock-up" is experienced.

Thus, the invention provides that at the end of the second stage, that is the end of the evaporation-absorption phases, and after some number of discrete cycles, there will be a rectification phase whereat the high boiling substance i.e. water in the ammonia-water solution, will be transferred from second compartment 23 to first compartment 22. This rectification can be accomplished either thermally or mechanically. It is not economically feasible to accomplish rectification thermally. For thermal rectification to occur, a fourth heat transfer medium at a temperature preferably higher than the first heat transfer medium temperature (although heat transfer medium at the first temperature could be used) would have to be transferred to second compartment 23 and the process interrupted for a few cycles until this fourth (or first) medium boiled high boiling point liquid out of second compartment 23. While this is technically feasible, it is preferred that in order to maintain continuous operation the rectification be accomplished mechanically and alternative embodiments of accomplishing mechanical rectification are shown in FIGS. 2 and 3. In FIG. 2, hermetically sealed pump 41 by means of a valve 45 operating in conjunction with valve 42 is used to pump whatever liquid is present in second compartment 23 to first compartment 22. Thus at the conclusion of the evaporation-absorption phase of some number of cycles, pump 41 would actuate to remove liquid, including high boiling point liquid, from second compartment 23. A simpler application is illustrated in FIG. 3 in which gravity is used to simply actuate a stopper valve 47 at the bottom of second compartment 23 to allow liquid to drain by gravity from second compartment 23 to first compartment 22. This may be simpler and more cost effective than pump 41 utilized in FIG. 2.

Figure 1:
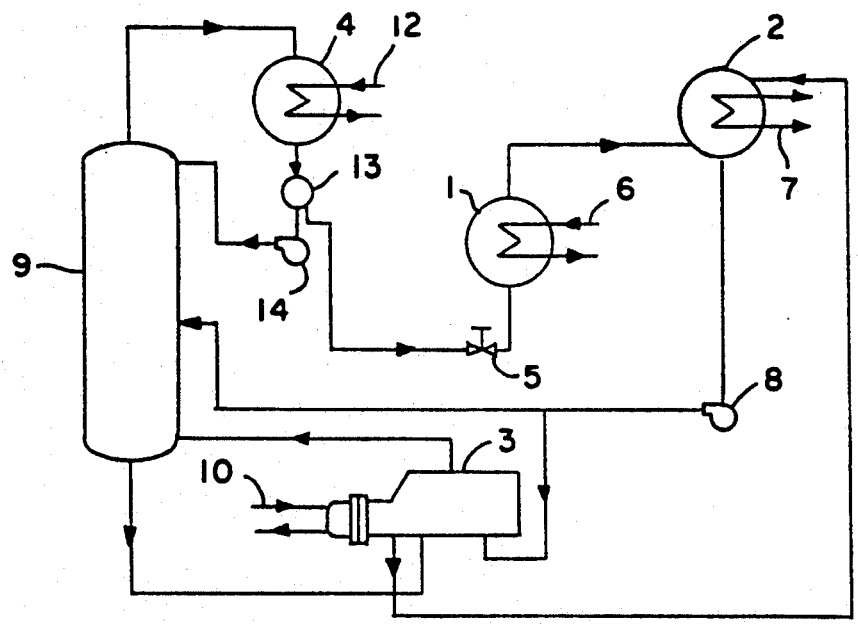
FIG. 1 is a diagrammatic view of a simplified absorption system disclosed in Perry's Handbook and is prior art.

Again, pressure vessels 20 shown in FIGS. 2 and 3 are alternative embodiments. It is contemplated that they will have application in large industrial processes wherein they will be significantly more cost effective than the simplified process disclosed in prior art FIG. 1. They are discussed prior to the preferred embodiment because their structure readily lends itself to an understanding of the process or system aspects of the invention as described in this section of the specifications.

PREFERRED EMBODIMENT

Figure 7:
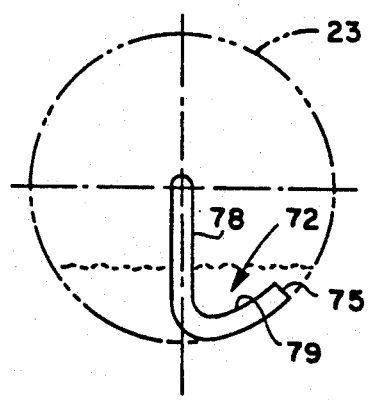
FIG. 7 is an end view of the transfer tube shown in FIG. 6 and positioned within the pressure vessel of the invention which is shown in dot dash line.
Figure 8:
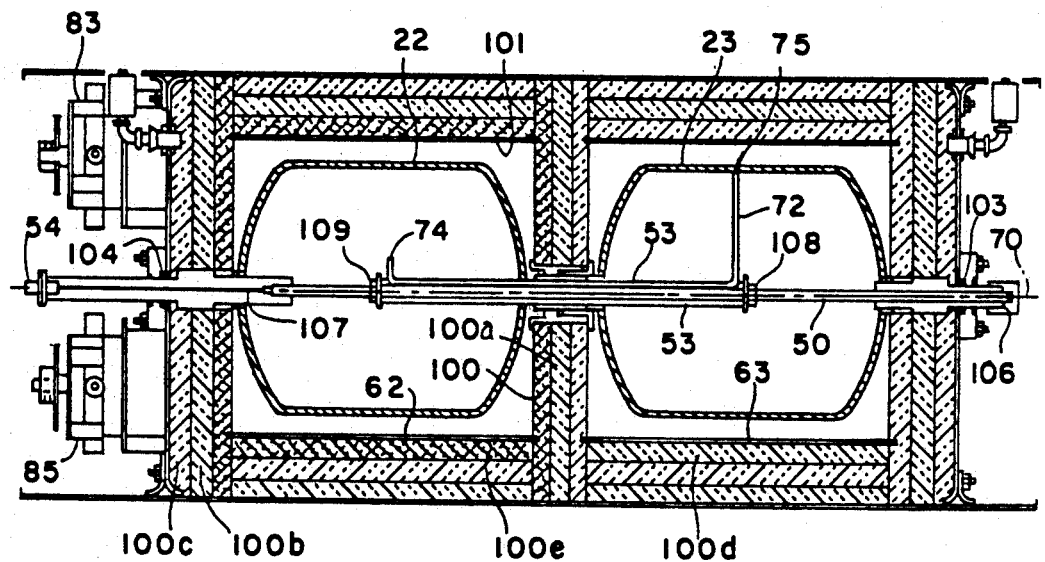
FIG. 8 is a view of the preferred embodiment of the invention similar to FIG. 5 but showing details of a different mounting arrangement than that shown in FIG. 5.
Figure 9:
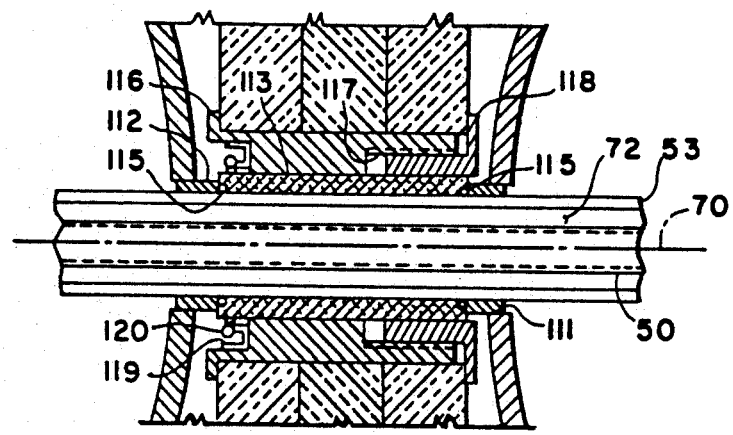
FIG. 9 is a view illustrating a detail of the heat pump construction shown in FIG. 8 where the communication tube extends from the first to the second compartment.

The preferred embodiment of the invention is disclosed in FIGS. 4-9 and the structure contains several features which will readily distinguish the preferred embodiment of the invention from the alternative embodiments discussed above and which further result in an extremely simple absorption heat pump that has wide application for relatively low Btu ratings or small size refrigeration-heating units. More specifically, heat pump 20 disclosed in FIGS. 4-7 illustrates the prototype which was developed to verify the invention while the unit disclosed in FIGS. 8 and 9 represents the further developed commercial application for residential use. In the prototype, first and second compartments 22, 23 are comprised of commercially available 20 lb. propane tanks which are secured to one another a fixed longitudinal spacing by means of a tensioning rod 50 sealingly threaded into threaded connections 51 formed at the ends of first and second compartments 22, 23. Tensioning rod 50 longitudinally extends through a communication tube 53 which sealingly extends into opposite ends of first and second compartments 22, 23. Communication tube 53 provides fluid communication between first and second compartments 22, 23 and its diameter is sized sufficiently large to prevent pressure drop between first and second compartments 22, 23 at the pressures at which first and second compartments 22, 23 are exposed to. First and second compartments 22, 23 connected by communication tube 53 give pressure vessel 20 a dumb-bell shaped appearance. A valve 54 in one end of either first and second compartments 22, 23 permits pressure vessel 20 to be filled with a predetermined quantity of ammonia and water and thereafter the valve is closed, permanently, to prevent any leakage of working medium to the environment. It is noted that while pressure vessel 20 is under some pressure during operation, the pressures will not exceeds about 300 psig which is significantly less than the pressure developed in the vapor pressure compression refrigeration cycle. Thus, once pressure vessel 20 is charged it can be factory sealed and there is little if any probability of leakage thereafter during the life of the unit. Thus, in the first instance a fluorocarbon is not used as a refrigerant and in the second instance, there is little probability of leakage of the working medium because of the low pressure and the fact the gas does not have to travel large distances through heat exchangers where leaks can develop as is the case with vapor compression refrigeration devices. Also very low (ppm) concentrations of ammonia vapor are easily detected due to ammonia's pungent odor, and thus any slight leak is readily discernible.

Completely surrounding first compartment 22 is a first thermally insulated container 62 and completely enclosing or containing second compartment 23 is a second insulated container 63. First and second containers 62, 63 are stationary and each has a heat transfer medium inlet 64 and a heat transfer medium outlet 65.

Figure 4:
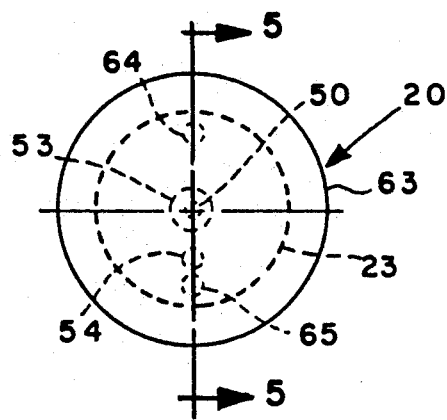
FIG. 4 is an end view of the preferred embodiment of the present invention.

Communication tube 53 extends through and is sealed by a journal bearing 68 centrally located in one of the thermally insulated walls of each first and second insulated containers 62, 63. Thus, journal bearing 68 permits a pulley (not shown) mounted on communication tube 53 and driven by an electric motor 66 to rotate as indicated by reference numeral area 69 so that both first and second compartments 22, 23 and communication tube 53 rotate about a common longitudinal axis 70 relative to stationary first and second containers 62, 63. It is contemplated that in a commercial embodiment of pressure vessel 20 shown in FIGS. 4-6, tensioning rod 50 could be eliminated when a different bearing arrangement would be utilized which would permit communication tube 53 to maintain appropriate leak tight connections between first and second compartments 22, 23 while permitting first and second compartments 22, 23, sealed within first and second containers 62, 63 to readily rotate. In commercial application, pressure vessel 20 along with first and second containers 22, 23 would be supplied as an assembly and connections at the job site would be made for installation of heat transfer medium fittings at inlet, outlet 64, 65 and the electric drive for rotation of pressure vessel 20 within first and second containers, 62, 63. The unit thus illustrated in FIGS. 4, 5 is to be viewed as equivalent to the factory supplied compressor of a vapor compression refrigeration air conditioning unit.

Figure 5:
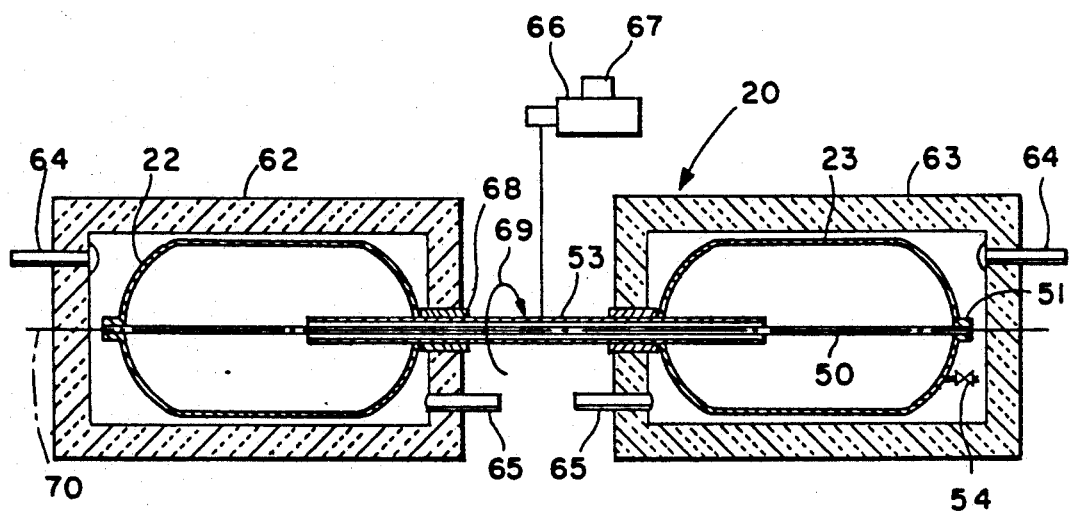
FIG. 5 is a schematic section view of FIG. 4 taken along line 5—5 of FIG. 4.
Figure 6:
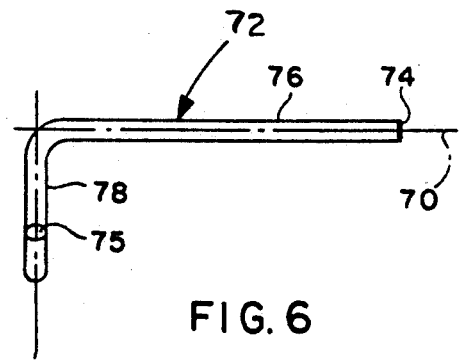
FIG. 6 is a plan view of the transfer tube of the present invention.

Referring now in particular to FIGS. 6 and 7, there is illustrated a transfer tube 72 which, for drawing clarification purposes, was not shown in FIG. 5. Transfer tube 72 is open ended on both sides. One open end 74 is adjacent the interior of first compartment 22 while the opposite open end 75 is within second compartment 23. Between open ends 74, 75 transfer tube 72 has a straight portion 76 which is attached to and extends through communication tube 53 and is generally centrally positioned along longitudinally axis 70 so that as communication tube 53 rotates so does transfer tube 72. Straight tube portion 76 extends from open end 70 and terminates in a radially-outward, head pumping portion 78 which in turn terminates in a scoop portion 79 (FIG. 7) which in turn ends at opposite end 75. Scoop portion 79 is configured to conform to the cylindrical interior surface of second compartment 23.

The preferred embodiment as thus described results in several advantages over the alternative embodiments illustrated in FIGS. 2 and 3. First, communication tube 53 permits first and second compartments 22, 23 to be easily insulated from one another by means of first and second containers 62, 63. The only temperature communication between first and second compartments 22, 23 is whatever might be transmitted by means of conduction heat through communication tube 53. However, the length of communication tube 53 which allows first and second containers 62, 63 to be spaced sufficiently apart from one another to prevent the heat from one from influencing the other is exposed to ambient atmosphere which, in a way neutralizes heat by conduction along communication tube 53. Given the size of transfer tube 53 and the cycle times of the process, heat transferred by conduction along communication tube 53 will not adversely affect the absorption cycle. Thus, the dumb-bell arrangement permits a large temperature differential to easily exist in a simple cost effective structure.

Second, rotation of first and second compartments 22, 23 in first and second containers 62, 63 produces several significant advantages. First and second compartments 22, 23 are thin wall structures. The heat transfer medium is preferably a hydronic liquid i.e. water with antifreeze. The heat transfer medium, preferably in liquid form, completely fills each of first and second compartments 62, 63. Relative rotation occurs between the outside surface of first and second compartments 22, 23 and the heat transfer medium in containers 62, 63 and also relative rotation occurs between the inside surface of compartments 22, 23 and the liquid working medium 30. When the low boiling point liquid is absorbed it produces a weak aqua boundary layer and movement of each compartment's wall by rotation continuously exposes a "new" surface of strong aqua to the ammonia vapor with the result that the boundary layer is reduced and mass transfer is enhanced. This rotation also tremendously increases the heat transfer between the heat transfer medium in containers 62, 63 and the heat and mass transfer of liquid working medium within first and second compartments 22, 23. Reference should be had to my U.S. Pat. No. 3,997,376 issued Dec. 14, 1976 entitled "Spray Mist Cooling Method" in which I control the boundary layer to prevent workpiece distortion during quenching of the workpiece for a general discussion of boundary layer during quenching of a heated workpiece. Again, by keeping the outside surface of the pressure vessel in contact with the heat transfer medium vis-a-vis containers 62, 63 the thin wall pressure vessel is at the temperature of a heat transfer medium and by rotation, a constantly new liquid covered interior surface is exposed to the ammonia vapor with the result that the boundary layer formed between working medium and the interior surface of pressure vessel 20 is reduced permitting quicker absorption of the vapor.

Significantly, rotation of first compartment 22 in the absorption stage of the second stage of the cycle provides an efficient way to continuously expose the high vapor pressure gas evaporated in second compartment 23 to a large surface area of low vapor pressure liquid. Large surface area results because of the rotation which sloshes the strong aqua working medium 30 about the interior of first compartent 22 thus resulting in efficient absorption of the vapor of the low boiling point liquid into working medium 30 without having to resort to such mechanisms as bubbling, filming or spray arrangements. Thus, the rotation concept is utiized to generate very high heat transfer coefficients while simultaneously aiding mass transfer during the gas absorption phase of the absorption cycle.

Importantly, rotation is also utilized to rectify or regenerate the system in combination with transfer tube 72. Whatever liquid composition is present in second compartment 23, that liquid, by gravity, will be at the bottom of second compartment 23. When second compartment 23 rotates, transfer tube 72 affixed thereto will likewise rotate. The liquid will enter scoop portion 79 when transfer tube 72 is positioned as shown in FIG. 7. When transfer tube 72 rotates 180°, gravity will cause the liquid to travel from scoop portion 79 to head pump portion 78 and from head pump portion 78 to straight portion 76 and from there to first compartment 22 through first open end 74. More specifically when transfer tube 72 is rotated slowly, a portion of the liquid in the second compartment 23 will fill head pump portion 78 which, when transfer tube 72 rotates 180° from its FIG. 7 position will develop a head pressure (i.e. inches of water column depending on length of head pump portion 78) which will be effective to pump the liquid through straight portion 76 to first container 22. If the speed of rotation is increased, centrifugal force will be developed in head pump portion 78 which will act to direct the liquid in head pump portion 78 against the interior surface of second compartment 23 instead of straight portion 76. In other words, rotational speed of transfer tube 72 can be set high enough to develop a centrifugal force which is sufficient to overome the pump's gravity force and thus render transfer tube 72 ineffective as a pump.

As discussed above, the high boiling point liquid will, as a function of time, vaporize, migrate and condense in second compartment 23. While the first and second stages of the absorption cycle are being completed, pressure vessel 20 is rotated by electric motor 66 at a speed sufficient to cause pressure vessel 20 to rotate about its longitudinal axis 70 to develop centrifugal force high enough to render transfer tube 72 ineffective. After the completion of the second stage of the cycle and after some predetermined number of cycles have been completed, the speed of electric motor 66 is reduced to be slow enough to permit transfer tube 72 to pump whatever liquid is present in second compartment 23 to first compartment 22. The rotational speed is then increased and a predetermined number of absorption cycles are performed which can be anywhere from 1 to "n". It is contemplated that a preset or adjustable timer 67 will utomatically cycle electric motor 66 at its slow-fast speeds. However, any number of control schemes which could also employ some form of transducer to sense liquid level in second compartment 23 can be utilized. It should also be noted that the higher rotational speeds employed during the absorption cycle enhance the heat transfer-absorption aspects of the invention discussed above.

With reference to the prototype illustrated in FIGS. 4-6, as already indicated, the size of first and second compartments 22, 23 is equivalent to a 20 lb. propane tank. The size of communication tube 53 is 12" long between compartments and of a 1.5" I.D.

An ammonia-water working medium sufficient to fill one-half of one of first or second compartments 22, 23 is used. While the size of the first and second compartments do not have to be identical, the working medium 30 cannot, by volume, be greater than 50% of the volume of the largest compartment because of operational and process considerations. The composition of high vapor pressure to low vapor pressure substance is based on conventional entropy-temperature considerations for any given mass of working medium in turn controlled by the size of pressure vessel 20. Thus the invention is not to be limited by any specific composition or make-up of working medium 30. As of the date of this application, efficiencies have not been verified. However, good results have been obtained with cycle times of anywhere between 6 to 30 minutes using an initial ammonia-water concentration of fifty per cent at the three temperature ranges discussed herein. Calculations indicate that for the ammonia-water concentration specified 50-50), almost all (90%) of the ammonia is cycled to second compartment 23, at least for the first cycle. Furthermore, there appears to be no need (for the 50-50 composition) to rectify the composition by use of transfer tube 72 until several cycles have been completed. That is there appears to be no noticeable drop in efficiency immediately upon completion of the first cycle.

Figure 10:
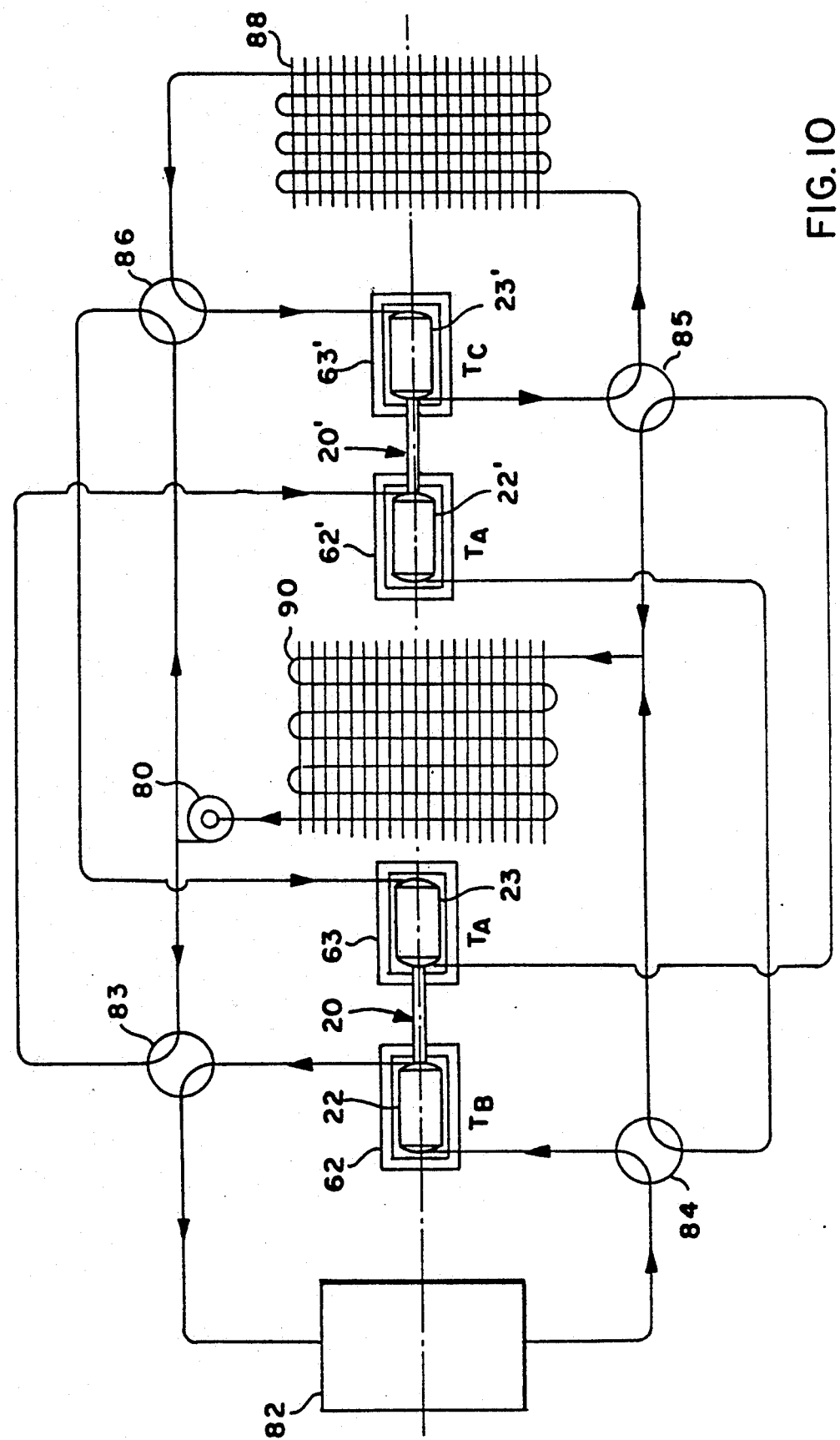
FIG. 10 is a schematic "piping circuit" of the invention in its refrigeration mode with one of the vessels in the first cycle stage while the other vessel is in its second stage of the cycle.

The contemplated commercial embodiment of my heat pump is shown in FIGS. 9 and 10 where prior reference numerals are used to designate like parts or components. In the arrangement shown in FIG. 8, insulation the form of conventional fiberboards or closed cell (CELL) foam such as shown by reference arrows 100, 100a, 100b, 100c etc. is used to form first and second containers 62, 63. Mounted to the fiberboard 100 which define the interior of first and second compartments is sheet gage thickness steel or cladding 101 to form containers 62, 63 and to define a structure for attachment of insulation. In the arrangement shown in FIG. 8 tensioning rod 50 is journaled in outboard bearings 103, 104. At one end of tensioning rod 50 is an adjusting nut 106 for tightening tensioning rod 50. At the other end of tensioning rod 50 is charge valve 54 which charges first compartment 22 through a charge tube 107 pinned to tensioning rod 50. Locating nuts 108, 109 threadingly engaging tensioning rod 50 to centrally position communication tube 53 relative to first and second compartments 22, 23, it being understood that communication tube 53 is appropriately cut away or relieved at locating nuts 108, 109 to maintain unrestricted fluid communication between first and second compartments 22, 23. Also shown in FIG. 9 are two four-way valves 83, 85 described hereafter which are connected (not shown for drawing clarity) to inlet and outlets 64, 65 of first and second containers 62, 63.

Details of the seal between chambers 62 and 63 and the central support for communication tube 53 where communication tube 53 passes between first and second containers 62, 63 is shown in FIG. 9. A tube opening 111 in each first and second compartment 22, 23 receives a gas tight welded cylindrical collar 112 which axially abuts a cylindrical journal member 113 axially extending therebetween. Adjacent each axial end of collar 112 and journal member 113 is an elastomer or O-ring seal 115 which is compressed to maintain first compartment 22 sealed from second compartment 23 while simultaneously sealing communication tube 53 relative to collars 112 and journal member 113. Journal member 113 passes through insulation board 100 by a cylindrical flange member 116 with an annular tapered groove 117 at one axial end thereof which in turn receives a cylindrical, flanged locking member 118 wedged between the outside diameter of journal member 113 and cylindrical flange member 116. At the opposite end of cylindrical flange member, a channel shaped, annular rotary seal 119 contains a seal ring 120 which exerts a spring force onto journal member 113 to maintain the central sealing arrangement.

APPLICATION

As noted above, the heat pump of the present invention was specifically developed for residential, mobile and commercial use and several arrangements are disclosed in FIGS. 10, 10A, 11, 12, 12A, 12B and 12C. All of these arrangements use two pressure vessels 20 in a timed relationship so that when one pressure vessel is in stage I of the absorption cycle, the second pressure vessel is in stage II of the absorption cycle. This is of course not necessary. Only one pressure vessel 20 could be supplied and it simply would not heat or cool during one of its stages in the cycle. However, two pressure vessels are illustrated so that continuous heating or cooling is available from the heat pump. The cost of the pressure vessels including their containers 62, 63 is not significant when compared to the overall cost of the installation but since the same heat transfer medium can be utilized, the additional second pressure vessel 20 is not viewed as being cost detrimental.

FIG. 10 discloses use of my heat pump in an air conditioning arrangement. All the application drawings are schematic and the heat transfer medium for discussion purposes is assumed to be one common hydronic fluid which is pressurized by three separate pumps 80 (only one pump is shown for drawing clarity) supplying pump pressure for all circuits by means of conventional four-way valves. It is not necessary however that the heat transfer medium be a liquid. It could be gas, and for some of the temperature ranges, for example $T_c$ the heat transfer medium could be liquid and for others, for example $T_a$, the heat transfer medium could be air. Further, for $T_a$, outside air could be simply drawn in and exhausted without any intermediate heat transfer surface. However, in the preferred embodiment, one common hydronic liquid like i.e. glycol antifreeze is used as the heat transfer medium. It is noted that the pump pressure to circulate the hydronic heat transfer medium is very low and that the system is open to air by means of hydronic air vent valves. There is no need for the extreme tightness required in a gas vapor compression refrigeration cycle.

Figures 17, 18:
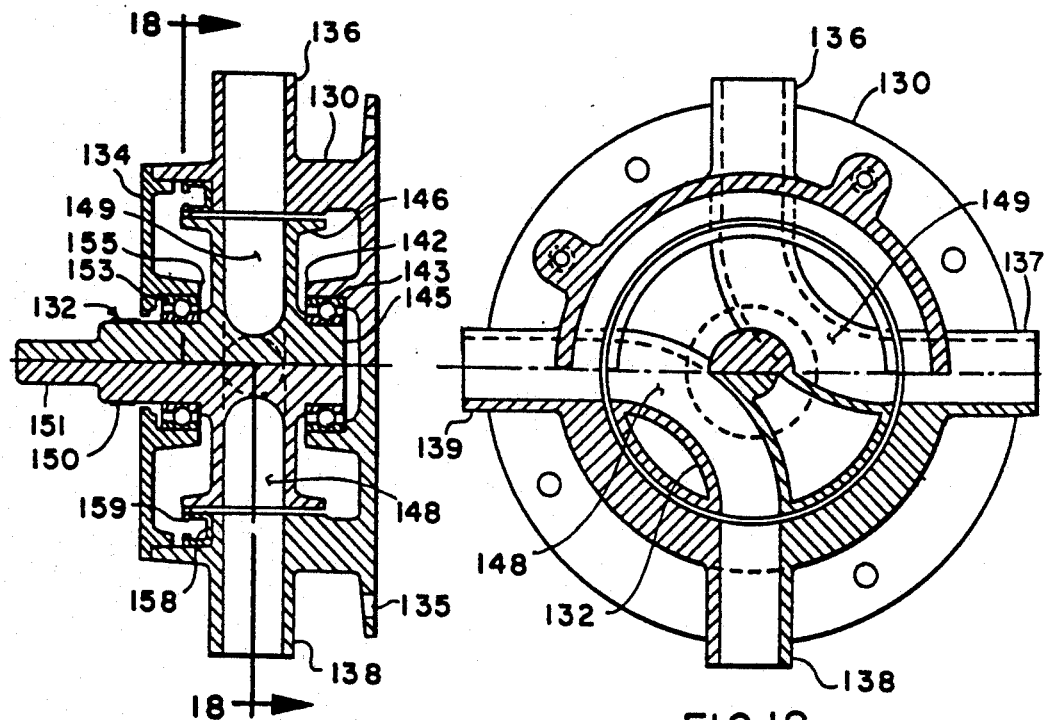
FIG. 17 is a side elevation, cross-sectioned view of one of the four-way valves shown in FIG. 15.
FIG. 18 is an end elevation view of the four-way valve taken along line 17—17 of FIG. 16.
Figure 16:
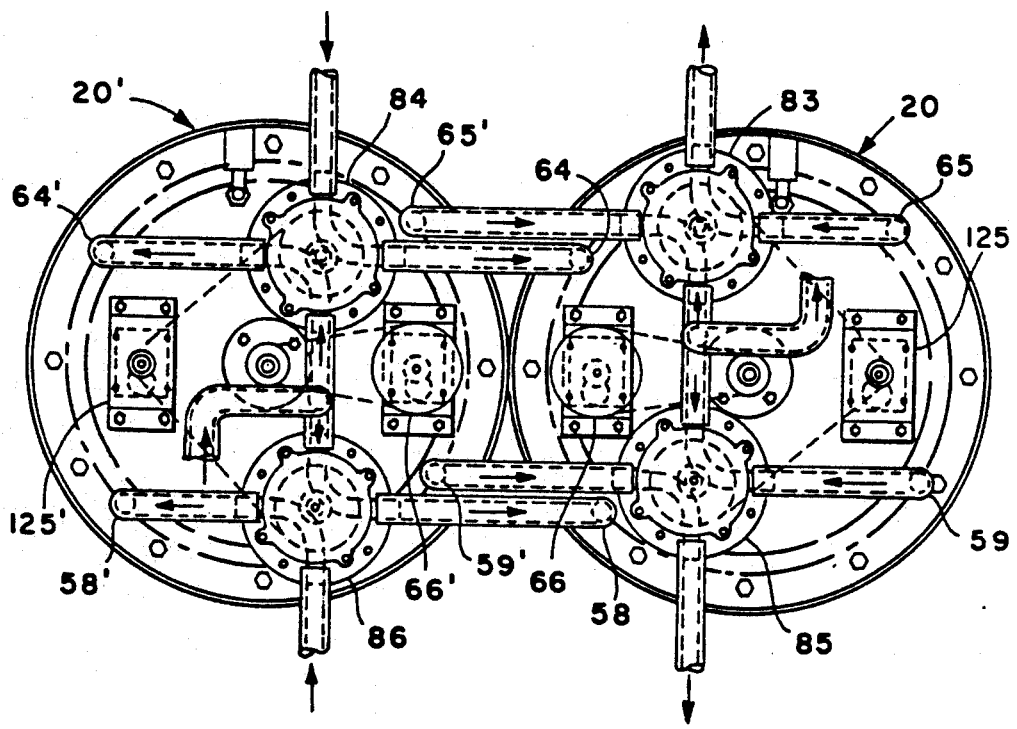
FIG. 16 is an end view of two heat pumps with valving therebetween.

The basic elements of the air conditioning system hown in FIG. 10 include, in addition to pump 80 and first and second pressure vessels 20, 20' encapsulated in their respective first and second insulated containers 62, 63 and 62' and 63', a gas-fired heater 82, four four-way valves 83, 84, 85, 86, an in-duct cooling coil or heat exchanger 88 and an external air-cooled coil or heat exchanger 90. It is preferred that heater 82 be a gas-fired heater although an electric heater or oil fired burner can be employed. The purpose of heater 82 is to generate sufficient heat to raise heat transfer medium to temperatures as high as about 300° F. Four-way valves 84-86 function as conventional four-way valves. Their design is illustrated in FIGS. 16 and 17 and will be described hereafter. In-duct cooling coil 88 is viewed as the "A" coil mounted in the plenum chamber of a residential furnace. Heat transfer medium a the cold temperature, preferably just above the freezing point of water is circulated through coil 88 when the furnace fan flows air over in-duct coil 88 house air temperature is lowered for cooling purposes. External heat exchanger 90 is equivalent to the heat exchanger mounted outside the dwelling in a vapor compression air conditioning unit and a fan circulates outside air at whatever temperature the outside air is against the heat transfer medium contained within heat exchanger 90 to maintain that heat transfer medium at ambient temperature. In FIG. 10 first pressure vessel 20 is in the first stage of the aborption cycle which means that first compartment 22 is at the boiling temperature $T_b$ while second compartment 23 is at ambient temperature $T_a$. Simultaneously, second pressure vessel 20' is in the second stage of the absorption cycle which means that second compartment 23' is at cold temperature $T_c$ while first compartment 22' is at ambient temerature $T_a$. Four-way valves 83-86 are set to their positions shown in the drawings which establishes paths for the heat transfer medium shown by the arrows in FIG. 10. No further explanation is believed necessary. It is noted that in FIG. 10 second compartment 23 for first pressure vessel 20 and first compartment 22, of second pressure vessel 20' are both in fluid communication with external heat exchanger 90 and that cooling for the residential structure is being provided by second compartment 23, of second pressure vessel 20'. When the cycle is switched to its next stage four-way valves 84-86 are rotated to the position shown in FIG. 10A. This now places first compartment 22 of first pressure vessel 20 at ambient temperature $T_a$ while second compartment 23 of first pressure vessel 20 is at cold temperature $T_c$ in fluid communication with in-duct cooling coil 88. First compartment 22' of second pressure vessel 20' is at boiling temperature $T_b$ while second compartment 23' of second pressure vessel 20' is at ambient temperature $T_a$. The flow paths are those shown by the reference arrows illustrated in FIG. 10A and no further discussion is believed necessary.

Figure 10A:
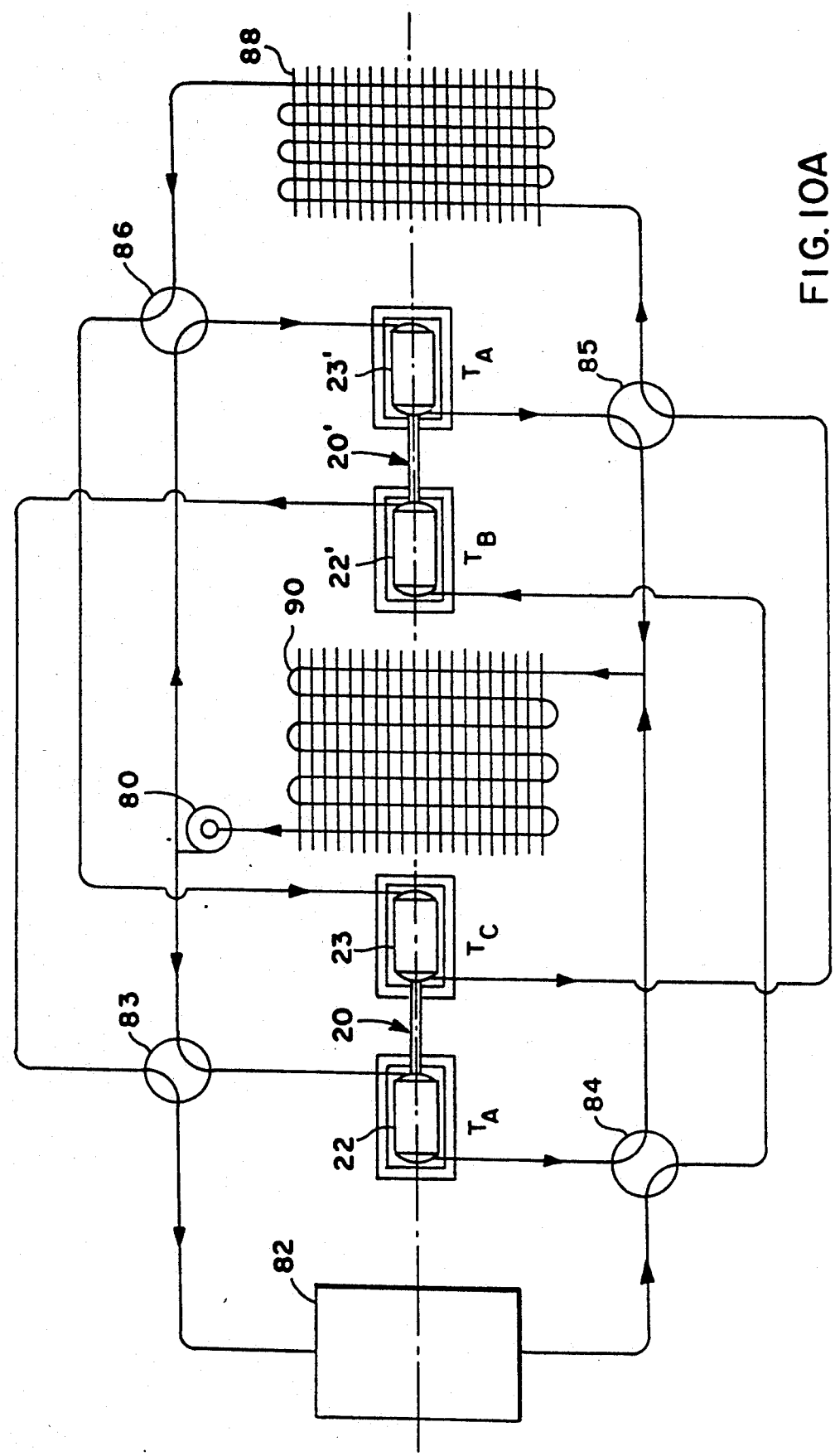
Figure 11:
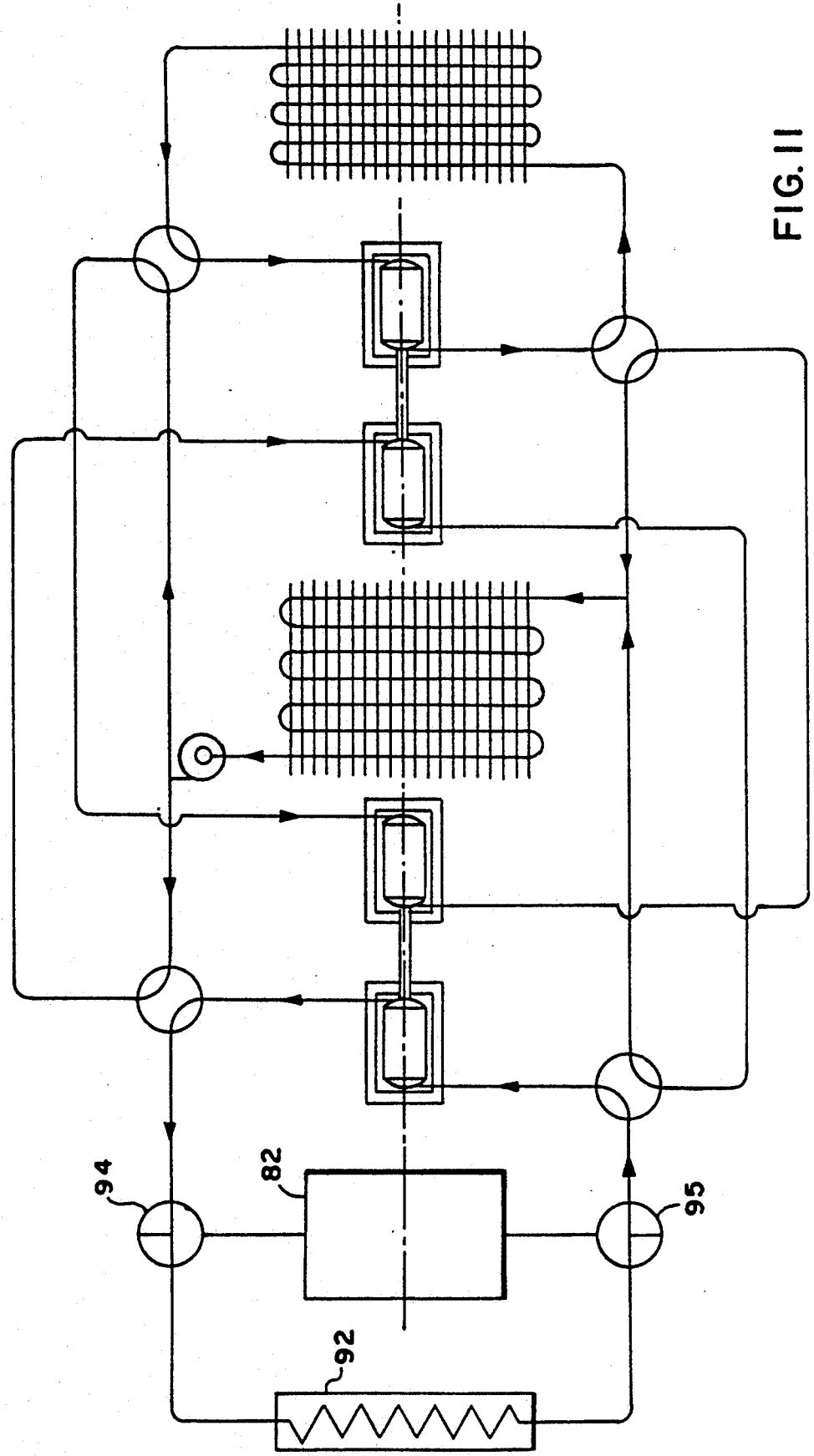
FIG. 11 is a schematic "piping" diagram of the present invention with heat recovery.

FIG. 11 illustrates a modification to the refrigeration cycle shown in FIGS. 10 and 10A. The same refrigeration apparatus illustrated in FIGS. 10 and 10A is also shown in FIG. 11 and no further discussion is necessary except to note that four-way valves 83-86 correspond in position to that shown in FIG. 10. Thus FIG. 11 shows summer cooling Stage I. In FIG. 11 gas fired heater 82 is utilized to supply heat to a hot water heater 92. This can be done for example by inserting two three-way conventional valves 94, 95 in the boiling temperature piping circuit as diagrammatically illustrated in FIG. 11. Heater 82 would heat the transfer medium at the boiling temperature i.e. about 300° F. which would then be circulated in one of three possible closed loop configurations vis-a-vis actuation of three-way valves 94, 95. If hot water heater 92 did not need further heat, the piping circuit would simply comprise first container 62 or 62' and gas fired heater 82 in a closed loop. If the air conditioning arrangement was not utilized, the closed loop circuit would simply comprise gas fired heater 82 and hot water heater 92. Finally, if hot water was required and the air conditioning system was being utiized, the piping circuit would comprise first container 62, or 62' gas fired heater 82 and hot water heater 92. Basically, the conventional burner utilized in a conventional hot water heater powers my heat pump. Thus, in accordance with the invention, the system as shown in FIG. 11 either includes a separate burner 82 and a hot water heater casing which, because it does not need a separate burner, is less expensive than a conventional hot water heater or, alternatively, the price of my absorption heat pump is reduced because it uses the burner in a conventional hot water heater to heat heat transfer medium to the $T_b$ temperature.

The use of a water heater also has another significant energy saving implication. Warm water (i.e. hot water heater) is conventionally heated to temperatures between 130° F. and 160° F. During the absorption phase of each cycle, significant amounts of heat are generated and are extracted in external heat exchanger 90. By placing the water heater 92 in the flow path between the exit of container 62 or 62' and external heat exchanger 90, it is possible to generate large amounts of hot water for use in residential or commercial settings. The arrangement would be identical to that in FIG. 11 but with the water heater 92 in a different loop as described. This arrangement will significantly increase the C.O.P. (Coefficient of Performance) for my invention.

Figure 12:
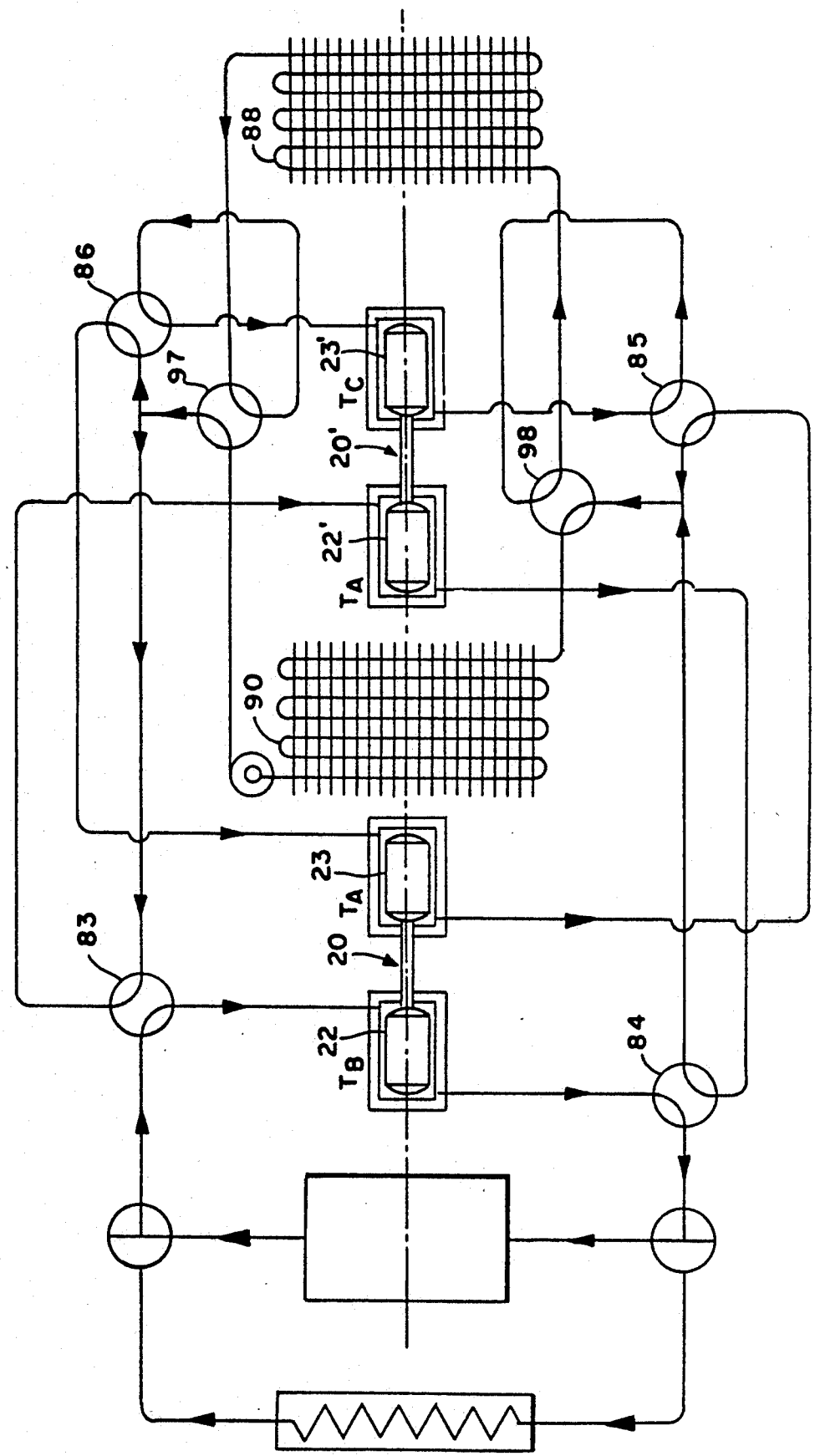
FIG. 12 is a schematic "piping" diagram of the present invention for heating and cooling purposes with heat recovery with valving switched to show the invention in its summer cooling setting, stage I.
Figure 12A:
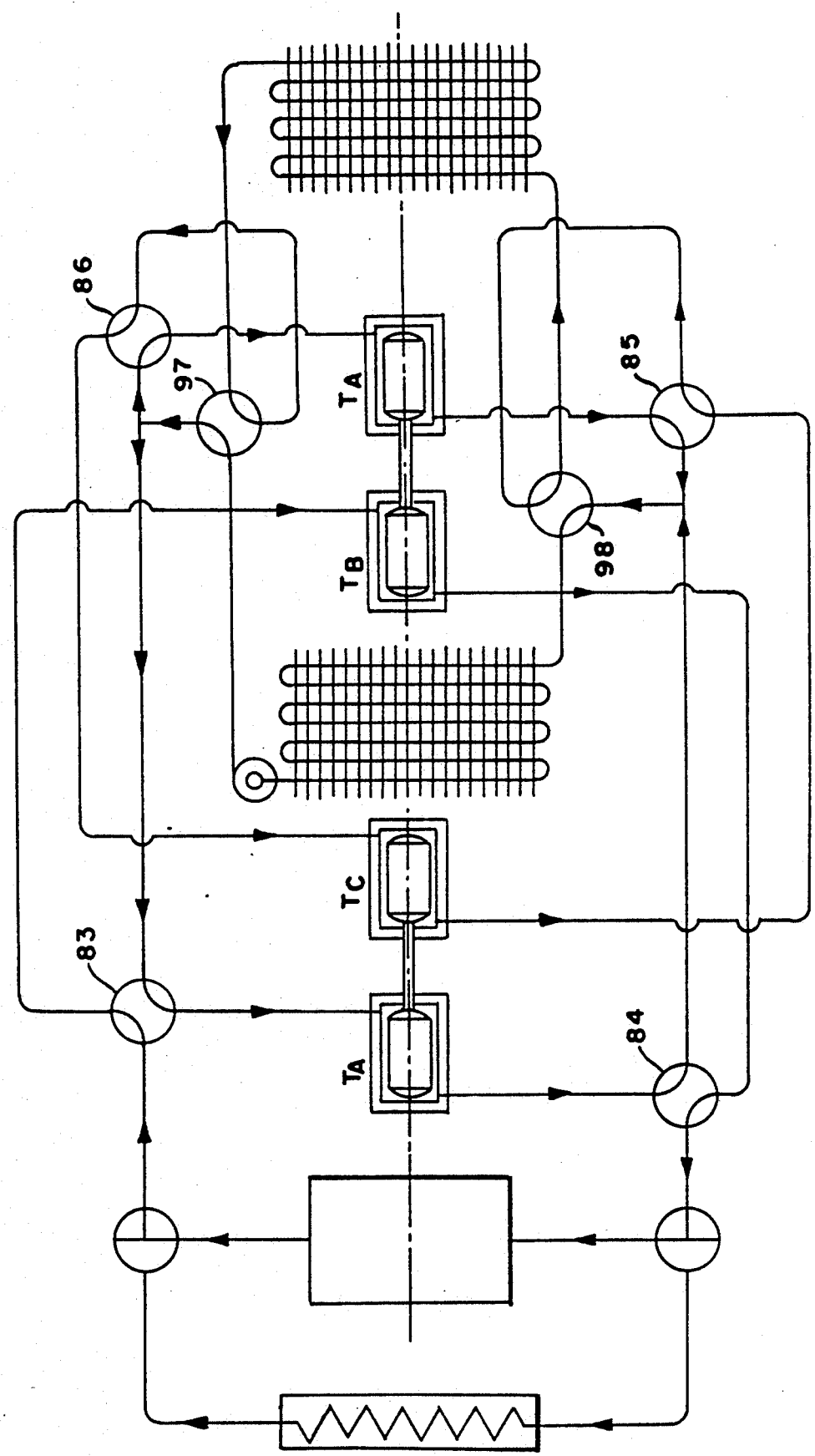
Figure 12B:
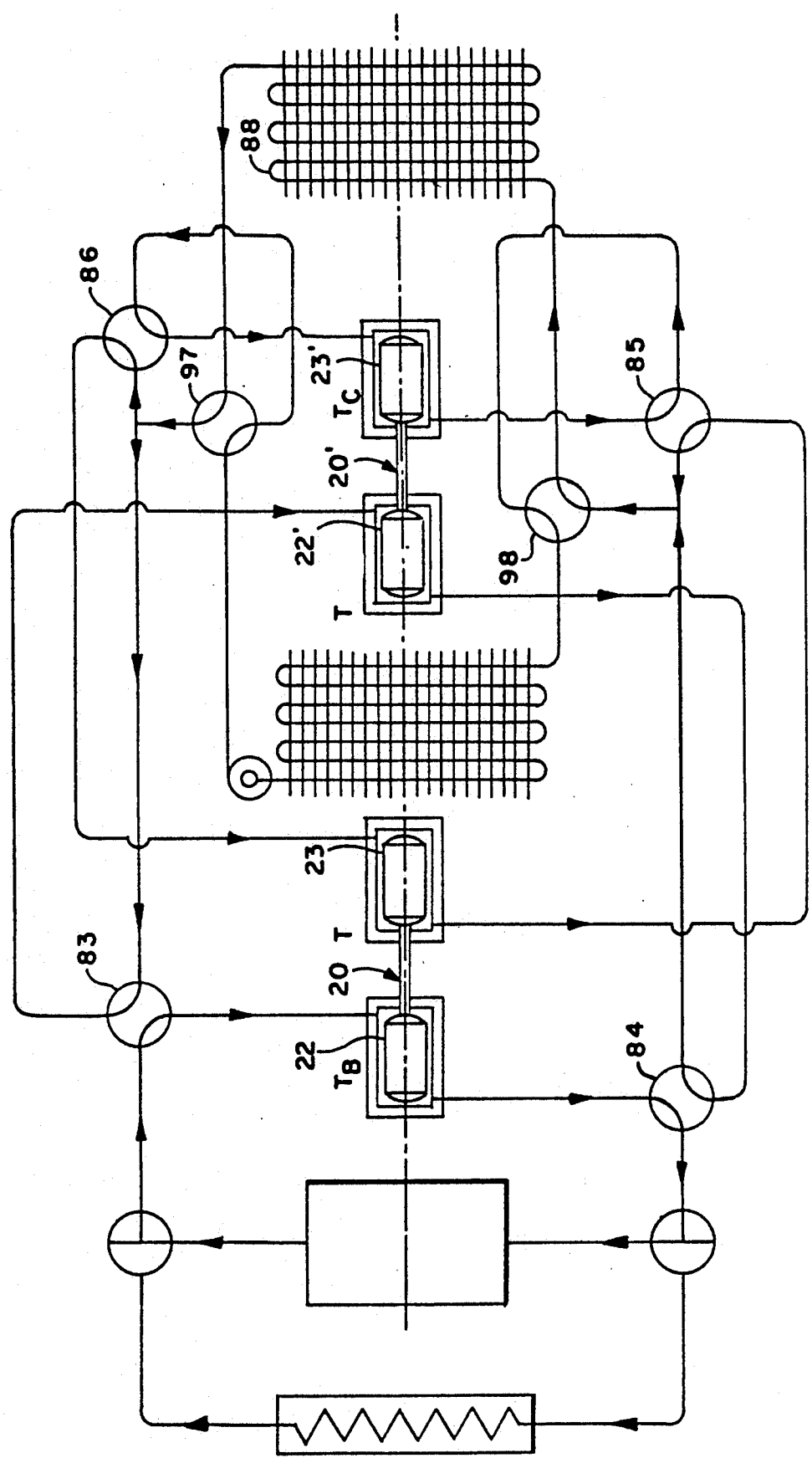
Figure 12C:
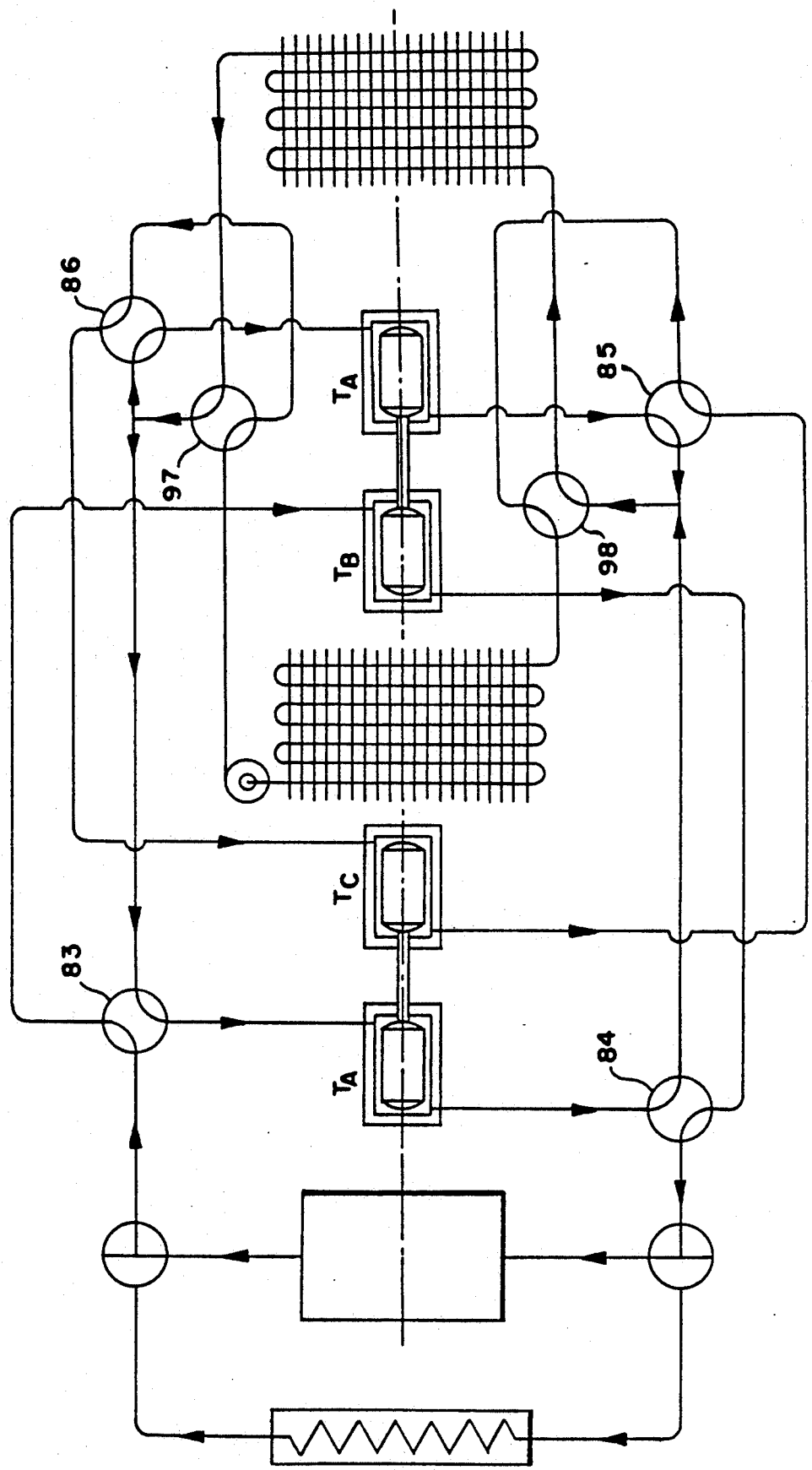

FIGS. 12, 12A, 12B and 12C illustrate the application of my heat pump for both heating and cooling. Additional apparatus for this purpose simply includes two winter four-way valves 97, 98. When winter four-way valves 97, 98 are activated the functions of in-duct cooling coil 88 and external heat exchanger 90 are reversed from that which they are utilized for in the air conditioning mode. That is, in-duct cooling coil 88 now functions as the source for maintaining heat transfer medium at ambient temperature while external heat exchanger 90 functions as the source for maintaining heat transfer medium at its cold temperature. FIG. 12 shows the heat pump application in the first stage of the absorption cycle for summer cooling in which first compartment 22 of first pressure vessel 20 is at boiling temperature $T_b$ while second compartment 23 of first pressure vessel 20 is at ambient temperature $T_a$. At the same time, first compartment 22' of second pressure vessel 20' is at ambient temperature $T_a$ while second compartment 23 prime of second pressure vessel 20 prime is at cold temperature $T_c$. Note that four-way valves 83-86 are in their same position as they are in FIG. 10 anc that winter valves 97, 98 do not affect the basic piping circuits shown in FIG. 10. FIG. 12A is the second stage of summer cooling and corresponds to FIG. 10A with four-way valves 83-86 cycled to the same position as shown in FIG. 10A and with winter four-way valves 97, 98 unactuated so that they remain in the same position as shown in FIG. 12. FIG. 12B illustrates the system in its winter heating mode with the system in its first stage in which first compartment 22 of first pressure vessel 20 is at boiling temperature $T_b$ while second compartment 23 of first pressure vessel 20 is at ambient or duct temperature $T_a$. Simultaneously, first compartment 22' of second pressure vessel 20' is at duct or ambient temperature $T_a$ while second compartment 23' of second pressure vessel 20' is at cold temperature $T_c$. The flow of the heat transfer medium of the various "piping" circuits is as shown in FIG. 12B. Note that four-way valves 83-86 are in the same position that they are shown at in FIGS. 10 and 12. Winter valves 97, 98 are thus rotated to the position shown in FIG. 12B which effectively then switches the functions of in-duct coil 88 with that of heat exchanger 90 as discussed above. Finally, the second stage of the winter heating mode is shown in FIG. 12C. In FIG. 12C winter four-way valves are in the same "on" position as shown in FIG. 12B and four-way valves 83-86 are cycled to the same position as shown in FIGS. 10A and 12A.

The invention has been described with reference to a residential heating-cooling application. It is contemplated that the invention is not limited to such applications. The embodiments of FIGS. 2 and 3 disclosed the invention applied to an industrial commercial application. Industrial application includes manufacturing processes which require cooling or heating of various fluids. It is specifically contemplated that the preferred embodiment of FIGS. 4-9 can have application in the automotive and vehicular field. As stated above, the heat transfer medium does not have to be a hydronic fluid. In an automotive air conditioner application of my invention, it is contemplated that only one pressure vessel 20 would be utilized. The heat transfer medium at ambient temperature would be air taken from the air pump installed on the vehicle as part of the vehicle's pollution control system. Similarly, the heat transfer medium at the boiling temperature would be siphoned off from a portion of the exhaust gas recirculated in the EGR system of the vehicle. Thus, the EGR and the air drawn by the air pump would comprise the heat transfer medium at $T_b$ and $T_a$ circulated in first container 63 in heat transfer relationship with first compartment 22. A liquid (antifreeze) in the heater core of the automotive vehicle would be the heat transfer medium at the cold temperature $T_c$. Valves would be utilized to periodically permit the heater core fluid to circulate in and out of second container 63 with the valves closed to permit the air pump to circulate air at ambient temperature in second container 63 during the condensing phase of the process in the first stage while heater core fluid would circulate in the evaporation phase of the second stage of the process. Pressure vessel 20 would be rotated by a separate electric motor 66 in a manner not dissimilar to that discussed with reference to FIG. 5. The invention is non-polluting to the atmosphere and would satisfy pollution requirements prohibiting fluorocarbons currently used in vapor compression automotive air conditioners.

In the preferred embodiment of the invention applied to a residential heating/cooling application, heat pumps 20, 20' would be supplied as a unit in the configuration shown in FIG. 15 with four-way valves 83-86 positioned at one end of the heat pumps as shown. In FIG. 16, the container's inlet and outlet reference numerals 64, 65 apply to the inlet and outlet of first container 62 (and similarly reference numerals 64', 65' apply to inlet and outlet of first container 62' of second heat pump 20'). The inlet and outlet of second container 63 would be piped through the insulation of first container 62 to exit the same axial end of heat pump 20. Thus for FIG. 16, the inlet and outlet of second container 63 are designated respectively by reference numerals 58, 59 (and similarly by reference numerals 58', 59' for second heat pump 20'). The valves 83-84 are shown as switched in the FIG. 10 schematic drawing. Switching of valves 83, 85 is caused by a timer actuated motor 125 driving a belt connected to the valves for heat pump 20. Similarly, valves 84, 86 are switched by timer actuated motor 125'. Also shown in FIG. 16 are motors 66, 66' for driving tensioning rod 50, 50' of first and second heat pumps 20, 20'. (In FIG. 5, motor 66 drives communication tube 53. In the commercial embodiment motor 66 drives tensioning rod 50 adjacent gas charge valve 54.). Thus, FIG. 16 shows that the heat pump is supplied as one stand alone item with all adjustments, connections, made at one end thereof permitting easy installation in any number of space restrictive applications. All the installer needs to do, besides making the electrical connections, is to attach the hydronic lines to the inside heat transfer coil, the outside heat transfer coil and the hot water heater.

Four-way valves 83-86 are, in theory, conventional. Because of the FIG. 16 application, a suitable four-way valve design has been designed and is illustrated in FIGS. 17 and 18. Again, other conventional valves can be used with my invention. However, the valve design illustrated is preferred. Four-way valve 83 generally comprises an annular housing 130, a valve plug member 132 rotable within housing 130 for actuating valve 83 and an annular assembly cover 134 for sealing the valve. Housing 130 is stationary by means of bolt holes 135 for fastening to heat pump 20 and has four outlets 137-140 spaced at right angles to one another. Housing 130 has adjacent its base axial end an annular boss portion 142 to which is mounted a first bearing 143. Valve plug 132 has a cylindrical end portion 145 which is mounted to the inside race of first bearing 143 to permit valve plug 132 to rotate relative to housing 130. Axially adjacent cylindrical end portion 145 is a valve plug portion 146 containing two curved passages 148, 149 for communicating with selected outlets 137-140. Axially adjacent plug portion 146 is a stepped hub portion 150 having a shaft end 151 for mounting a belt pulley to be driven by motor 125. A second bearing 153 mounted in cover 134 which in turn is secured to housing 130 has an inside race securing hub portion 155 to provide the second bearing support for valve plug 132. An annular "C" shaped rotary seal 158 mounted to housing 130 causes a seal ring 159 to seal valve plug 132 in any one of its rotated positions. Because a common fluid is used in the residential application any minor leakage of fluid between valve plug 132 and housing 130 has no deleterious effect on the operation of heat pump 20. This leakage can be eliminated by depositing a non-wetting coating around each penetration 148 and 149 and 137-140 in plug and housing. The valve illustrated in FIGS. 17 and 18 is preferred because of its low cost, very low frictions and durability which is inherent in the simple design shown.

TECHNICAL DESCRIPTION

In a typical batch absorption cooling cycle two different cycle segments are periodically alternated. In the first segment of the cycle, the boiling cycle, the high vapor pressure component is driven out of solution in the boiler section. This step is achieved by increasing the temperature of the mixture, creating high vapor pressure within the gas phase consisting mainly of the lower boiling point component and condensing the high pressure vapors in a second vessel, now acting as condenser, at a second lower temperature. The higher temperature we will call the boiler temperature, the lower condensing temperature the condenser temperature.

In the second segment of the cycle, the cooling cycle, the process is reversed. The condensed vapors in the cooling section are evaporated by a liquid at the third temperature, the cooling temperature. The evaporation occurs under the action of the very low vapor pressure that exists in the boiler section when the remaining liquid (virtually all water) in the boiler section, now acting as an absorber, has been cooled to ambient or condenser temperature. The virtually pure phase of the high vapor pressure component begins to boil in the cooling section, now acting as the evaporator, and the heat for this boiling process must be provided first by the sensible heat in the condensed ammonia and then by any heat source or heat transfer medium in contact with the evaporating ammonia. At the end of the cooling cycle segment the higher vapor pressure liquid, the ammonia, has been driven over into the boiler section, now acting as absorber, and the cooling section is virtually emptied from ammonia. When this condition is reached the cycle can be repeated.

To implement the two segments of the cycle a pressure vessel with at least two compartments is required each of them equipped with heat transfer surfaces that facilitate achievement of different temperature levels in the two compartments. The pressure in the vessel containing the compartments is always equalized. The passages between the compartments must be kept so large as to preclude any build up of pressure differentials. The overall pressure level is either high or low dependent on the temperature levels in the two drums and based on the composition of the respective liquids. The two compartments are thermally insulated from each other to prevent heat transfer from one compartment to the other by conduction or convection.

In FIGS. 2 and 3 the concept of the new, low cost heat pump is depicted. Two compartments within a pressure vessel are shown which are connected in the gas phase by large passages. There is also a much smaller connection which allows for transfer of liquid from one compartment to the other. This liquid transfer can be instigated by any means as for instance gravity or centrifugal force. This liquid transfer is essential for the process and replaces thermal rectification. Thermal rectification is necessitated by the fact that a small portion of the lower boiling component in a multiple component solution is always evaporated together with the higher vapor pressure components. Over time and after completion of many cycles more and more of the lower boiling component is accumulated in the condenser compartment leading eventually to failure of the process.

By regularly removing any low boiling component from the condenser compartment the process maintains its efficacy.

The lowest cost process to remove the low boiling point component is by employing gravity. The condensing compartment is mounted high enough as to permit direct, regular drainage of the low boiling point residual liquid from the evaporator into the lower boiler compartment.

In both these depicted arrangements heat transfer surfaces in the form of coils or plates are used to transfer the necessary heat for controlling the temperature levels in either compartment. The respective heat transfer surfaces are designed to optimally provide the four heat and mass transfer functions comprising boiling, condensing, absorbing, and evaporating.

While this general arrangement of an absorption heat pump arrangement is well suited for larger commercial and industrial applications it is still too expensive and too bulky for small capacity applications like residential and leisure type air conditioning and cooling applications.

In FIG. 5 a further simplified arrangement is shown where the two compartments of the same pressure vessel rotate around the same geometric axis. The two compartments or drums are connected by a tube that penetrates on either end into the drums. In this configuration the pressure vessel with its two compartments assumes the shape of a dumbbell. In the drawing the two drums are mechanically held together by a tension rod. This design has been used for initial development testing but can be replaced by several other configurations.

One of the alternate designs will attach the connecting tube permanently to both drums. The tension rod then becomes superfluous. One of the drums can be closed permanently at its opposing end and the other drum will only have a valve for initial filling of water and ammonia or any other liquid solution into the drum assembly. The valve can then be closed permanently.

The drums are made to rotate. The respective drums not only serve as pressure containment vessels but also serve as heat transfer surfaces. In order to increase internal and external heat transfer they rotate and agitate the working medium liquid on the inside of the drum and the heat transfer medium on the outside of the drum surface. During the cyclic cooling process the higher vapor pressure component moves alternating from the boiler drum to the cooler drum and back into the boiler drum. This periodically reversing mass movement is caused by changing temperatures on the outside of the drums. When the boiler drum is hot and the cooler drum is at ambient temperature the high vapor pressure medium flows in direction of the lower temperature drum until the supply in the boiler drum is exhausted and only the lower vapor pressure liquid remains in the boiler.

To reverse the flow and to return the higher vapor pressure liquid into the boiler drum the external liquids in the insulated chambers enclosing the rotating drums are exchanged. The hot liquid on the outside of the boiler drum is changed from boiling temperature (200° F. to 350° F.) to ambient temperature (68° F. to 110° F.). This change in temperature on the outside of the boiler drum results in a corresponding temperature change in the cooling drum. Typically for cooling applications, the temperature on the outside of the cooling drum is maintained between 25° F. to 45° F. This cooling liquid is circulated to a coil in the air duct of an air heating furnace. The coil is similar in size to the coil of an electric heat pump unit.

A major process and efficiency advantage of this heat actuated absorption heat pump results from the fact that the surface temperature of the internal cooling coil can be controlled over a wide temperature range. This process feature has major implications on thermal efficiency and operating costs of this device. Mechanical vapor compression units operate at very low cooling coil temperatures. This mode of operation is necessitated by the properties of the refrigerant and leads to ice formation when cooling high humidity air. Energy for ice formation and for de-icing is wasted and C.O.P. is significantly impacted. In my invention the heat transfer takes place between the hydronic fluid and the refrigerant making it possible to control the temperature of the hydronic fluid independently. This type of operation allows to adjust the humidity within a space or dwelling independently and to prevent over drying of the air with it's resultant energy losses caused by condensation, freezing, and de-icing of excessive air moisture.

For best overall performance in a typical residential air conditioning setting a cold surface temperature of approximately 40° F. is ideal. When saturated air of 40° F. (with 100% humidity) is reheated to 78° F. a relative humidity of 28% results which is very comfortable.

In order to increase the thermal efficiency of the process the ambient liquid is not cooled every cycle all the way from ambient but rather the ambient liquid is emptied entirely and is replaced with cooler hydronic liquid. This hydronic liquid is recirculating in the cooling loop of an air conditioning system and the cooling coil for cooling air can either be positioned centrally in the air duct of a conventional residential air heating system or can be piped into individual cooling units in several rooms of a residence or other type of dwelling.

Mass transfer from one drum to the other, that is the direct flow of liquids inside the drums and between the chambers, is uninhibited by any flow resistance. The result is that the two sections of the cylinder can be kept at widely differing temperatures while the pressure in both chambers is maintained at the same level at all times. Accordingly the temperatures in the boiler section are either at a high level, the boiler temperature, or at a low level, the ambient temperature. The temperature in the cooling drum is either at the condenser (ambient) temperature or at the evaporation temperature of the cooling liquid. In either case the pressure is largely determined by the temperature and composition of the liquid in the cooling section.

The proposed invention in its lowest cost implementation uses two chambers that rotate about their respective axis at a high rotational speed. This rotation imparts a differential velocity between the heat transfer medium liquids on the outside and the surface of the rotating vessels. A similar differential velocity is created between the liquids on the inside and the rotating vessel walls. The relative movement between solid surfaces and liquids increases heat transfer by reducing the thickness of the boundary layer and by providing a strong mixing action within the two respective liquids. The result is the generation of some rather high overall heat transfer rates. These high rates in turn reduce the size of the heat transfer surfaces which are required to provide a particular level of performance for heating and cooling heat flows.

The rotating cylinder sections or drums are directly connected to each other and can be hermetically sealed. The working media pair can be filled into the two connected cylinder sections and can be made leak proof. Replenishment of working liquids or leaking of working media into the atmosphere is, therefore, eliminated making maintenance of these units easy. For the same reason these units are environmentally benign and will not release any harmful or toxic substances into the atmosphere. Contamination of the environment can be positively prevented.

One process complication still remains; under long term operation a slow migration of the lower vapor pressure liquid into the cooling section will occur and cannot be prevented. This accumulation of the lower vapor pressure fluid in the cooling section will make the unit less and less effective when operating over long periods. This degradation of performance can be reversed by a special thermal regeneration cycle. Such thermal cycle will, however, reduce the thermodynamic efficiency of the cycle and will consume more energy.

In the present invention the thermal regeneration has been replaced by a simple mechanical pumping device. This pump periodically transfers any accumulation of the low pressure fluid in the cooling section back into the boiler section. This pump is instrumental in making the proposed invention work consistently at high thermal efficiencies and in preventing a loss of performance.

The proposed pump shown in FIGS. 6 and 7 is in principle a type of Archimedes' screw. Instead of a screw a curved pipe in the form of a dip tube is used. Its one end reaches the periphery of the cooling section cylinder, its other end protrudes into the boiler section. Its forward curved end located in the cooling section points into the direction of the rotation of the pressure vessel surface. Upon each revolution of the rotating cylinders the tube rotates with the cylinder, the one end of the tube dips into the liquid held on the bottom of the cooling drum by force of gravity, collects a small amount of liquid, the liquid is elevated when the cylinder rotates, and under the influence of gravity the liquid flows through the length of the tube into the boiler drum. This pumping action is, however, not desirable when the cycle is in progress. In fact, this pumping action ideally should only occur at the end of the cooling segment of the absorption cycle just before the boiling cycle segment is initiated again.

This periodic pumping action has actually been implemented by operating the rotating cylinders at two different speeds. At the one speed the liquid is transferred, at the other, higher speed the influence of gravity is counteracted by the centrifugal force set up in the rotating dip tube. This centrifugal force can be made higher than the force of gravity and the liquid cannot flow. By periodically cycling between two different rotational speeds a periodic pumping action can be initiated. This periodic action exactly fulfills the pumping requirements of the cyclically operating absorption heat pump device.

By combining three elements, the pressure vessel with its two interconnected compartments, with several hermetically sealed pumping devices operating by different principles, and by a novel approach of combining the functions of pressure containment, compartmentalizing, temperature management, and of providing highly efficient heat and mass transfer surface areas a novel, low cost absorption heat pump has been implemented.

The heat pump works on a batch principle where temperatures are changed cyclically. The temperatures are changed by a set of four-way valves that periodically change the temperature levels in the respective compartments of the pressure vessel. By also actuating a periodic pumping device between the compartments one succeeds in implementing a periodically operating absorption cycle with an absolute minimum of hardware but a high level of efficiency. This minimization of necessary process hardware results in a major reduction in hardware complexity and equipment costs.

In FIG. 8 the entire batch absorption heat pump system is shown. The system consists of three independent heat exchangers. In the heater a hydronic liquid (normally a mixture of water and antifreeze or glycol) is heated to the maximum process temperature which is permissible in the boiler. This temperature is normally restricted to a maximum of 270° F., the critical temperature of ammonia above which ammonia will not condense. The corresponding critical pressure is approximately 1700 psia. However, as long as the cooling drum is cooled at a temperature of 104° F. the pressure in the drums will not exceed 20 atmospheres or 300 psi absolute.

When the liquid in the boiler drum reaches 250° F. and when the cooling drum is maintained at the ambient temperature of 104° F. the composition in the boiler drum will be depleted of ammonia in a short time. The ammonia has all migrated into the cooling drum. At this point the cycle can be reversed. The boiler drum is cooled to the ambient temperature and the cooling drum is cooled to the cooling temperature by recycled cooling liquid. The result is a rapid pressure change. The pressure falls from a maximum of approximately 300 psia to 50 psia. As a result the ammonia in the cooling drum begins to evaporate cooling down the cooling liquid. Evaporation of ammonia takes place in the cooling drum and the vapor is absorbed in the boiler drum in the water which has been cooled to ambient temperature and which can absorb a large amount of ammonia at this lower temperature. By selecting the proper proportion of the two liquids, water and ammonia in this example, the pressures at the respective process temperatures can be selected.

In FIG. 10 the absorption cycle is shown with two of the absorption units. The figure is drawn for the cooling mode which is typical for summer operation. By alternating liquids periodically from one absorption unit to the other the cooling cycle appears continuous and the three hydronic liquids at the three temperature levels (boiling temperature approximately 250° F., ambient temperature of 104° F., and temperature of 32° F. in our example) are switched periodically by the four four-way valves.

The 260° F. liquid is circulated through the heater and through either of the two boiler drums. In the figure the boiler drum is the drum on the far left. The 104° F. liquid, after picking up heat, circulates through the external air cooled heat exchanger where it gives off its heat to the ambient air and the cooled liquid is circulated by a pump to the cooling drum on the left side of the figure and to the heating drum on the right side of the figure. The cold liquid at 32° F. circulates through the cooling drum at the far right of the figure and through the in-duct cooling coil where it cools the air in a typical residential heating and air conditioning system.

Periodically all four valves are actuated and the flows are redirected switching the boiler from the left to the far right of the center of the figure and the cooler from right to left.

In FIG. 11 a hot water heater for a typical residential application has been added. This hot water heater uses the hot liquid which is produced in the beginning of each cycle segment. The cold water is preheated by waste heat from the process and the integral heater of the water heater is used only for final adjustment of the desired hot water temperature. Almost all of the required heat is provided by waste heat.

This addition reduces overall energy costs of a typical residence by a large percentage and reduces overall energy consumption in a residence using a gas fired heat pump for cooling and heating.

In FIG. 12 the cooling unit of FIG. 11 has been further modified and an additional set of valves for seasonal switching of the absorption heat pump from cooling mode to heating mode has been added. By adding this feature the absorption heat pump can provide heating during the winter and can pump heat from the cold outside air to the inside of the typical home. With an outside temperature of 32° F. one can generate 104° F. hot liquid which can be used in the heating coil of a typical air ducted heating system. The heating coil in this design is the same, identical coil as the cooling coil. Two additional four-way valves are all that is required to convert the gas fired absorption heat pump from cooling mode to heating mode or vice versa.

This addition of the heating mode will further reduce annual energy costs for a typical home because the apparent thermal efficiency of the heat pump in the heating mode is significantly higher than 100%. This performance is typical for heat pump cycles and the name "heat pump" is now being used generically for any device capable of pumping heat from a lower to a higher temperature.

In FIGS. 6 and 7 the remaining feature of the invention is shown, the dip tube acting as liquid transfer pump. At the high temperature maintained in the boiler which is typically not higher than 250° F. a total pressure of about 300 psia is developed. This pressure consists of two components, the vapor pressure of ammonia and the vapor pressure of water vapor. Accordingly, two vapors are being condensed; a large amount of ammonia and a much smaller amount of water vapor. The problem is that the water vapor cannot return to the boiler drum during the normal progression of the heat pump cycle. The return of condensed water from the cooling drum to the heating drum can only be accomplished by either one of two methods; a thermal one or a mechanical one. In the thermal method the cooling drum is occasionally regenerated by bringing the residual liquid to a high temperature and using it temporarily as the boiler drum. This results in a loss of useful up-time of the unit and a loss of thermal efficiency. It also increases equipment costs because the cooling end has to be designed for the higher boiler temperatures. In the mechanical method the accumulated water must be pumped using mechanical energy from the cooling drum into the boiler drum.

In FIGS. 6 and 7 the pumping device performing this function is shown. A curved tube of approximately 0.25 to 0.5 inches diameter is mounted immovably and permanently into the two drum assemblies. Upon each revolution of the cooling drum the curved portion of the tube is submerged in any remaining water puddle on the bottom of the drum. When the drum rotates the water that entered the tube tip is lifted similar to the action of an Archimedes' screw and is drained into the boiler drum. After a few revolutions the water that has condensed is pumped out and will not affect the efficiency of the absorption heat pump.

This pumping action is, however, only desirable after virtually all the ammonia has evaporated. The pumping action must, therefore, be switched on or off in period with the heat pump cycle. This can be accomplished by a pump as shown in FIG. 2 or by a valve shown in FIG. 3 which is mechanically, electrically, or magnetically actuated from the outside. In actual long duration operation such switching action may however fail occasionally and would necessitate the release of the media pair and the disassembly and repair of valve and actuator. In the pump of this invention the preferred way to periodically turn the pumping action on and off is accomplished by rotating the dip tube device alternating below or above a limiting rotational speed. At the lower speed the pump will pump, at the higher speed the centrifugal force will negate the gravitational force and pumping action will cease. In operation, therefore, one only needs to slow the rotational speed of the two connected drums for several revolutions to selectively pump out any residual water at the end of each cooling cycle segment. A two speed motor will accomplish this requirement.

In addition to designing low cost equipment components and selecting inexpensive manufacturing processes another major issue needs to be addressed; the issue of performance and comparative operating costs. Thermal efficiency of a cooling unit is commonly measured by the coefficient of performance of COP. This coefficient is defined as the ratio of the cooling effect, normally measured in Btu/hr, divided by the total heat input, also measured in Btu/hr, into the unit. It is this performance comparison where mechanical vapor compression equipment is normally superior to absorption type heat pumps.

Several options exist to enhance the thermal performance of absorption units. Absorption units can take advantage of low temperature waste heat, they can use solar heat as auxiliary heat input, and they can use some of the waste heat rejected by the absorption process itself to produce e.g. hot water. While the typical batch absorption process without such efficiency enhancements has COP values of approximately 0.75 these additional measures can increase the COP of the absorption process close to unity. With solar assisted heating the COP can, in fact, exceed 1.

Thermal inefficiencies result from the fact that the water in the ammonia water mixture must be heated to the final temperature of the strong aqua solution which can be as high as 250° F. The sensible heat in this strong aqua solution can either be used within the cycle or can be used for other heating purposes. When it can be used for hot water heating, for preheating of the cold weak aqua solution, or for other purposes one can achieve COP values close to unity. If the heat must be discarded without further use the value for COP for a typical weak aqua solution of 50% by weight of water becomes about 0.75, if the waste heat is used within the cycle or otherwise usefully applied and solar heat or other waste heat is used for heating the COP can be larger than unity.

The batch absorption process has a major advantage when used for heating purposes as will be necessary during the winter. For the process to operate in this fashion it is only necessary to reverse the role of the internal cooling coil and the ambient heat exchanger. In FIGS. 12B and 12C this switch between summer and winter operation is illustrated and is accomplished by alternating the positions of valves 97 and 98.

In the heating mode the batch absorption heat pump uses heat from the outside world to evaporate the ammonia in the evaporator drum. All sensible heat otherwise generated within the process can now be used productively. As a result the COP for heating increases to a value between 1.5 and 1.75. This means that for every Btu paid for fuel another half to three quarters of a Btu can be scavenged from the environment by pumping heat from a lower to a higher temperature level.

It is anticipated that the combination of providing cooling, hot water heating, and space heating within one single unit will create a very versatile appliance requiring low overall annual operating costs in many regions of the U.S. and the world. While not all of the specific features have been described that will result in a particular design of such a high efficiency and multi-purpose heat utilization appliance those skilled in the art are capable to design such an appliance and several variations of the required equipment features.

The batch absorption unit has been deliberately designed to only use a moderate amount of auxiliary electric power. This feature will make application of this unit in vehicular applications or applications in remote locations easier. The unit can be made to operate with a wide variety of electric power options. The first applications will be designed to work with conventional automotive electrical power, using 12 volt of direct current. Another version will be designed for 110 volt of alternating current. Other electric power options can be accommodated as well.

The invention has been described with reference to a preferred embodiment and alternative embodiments thereof. Obviously, modifications and alterations will occur to those skilled in the art upon reading and understanding my invention. It is my intention to include all such modifications and alterations insofar as they come within the scope of the invention.

Having thus defined the invention, it is claimed:

1. An absorption heat pump using a working medium of at least two substances, one substance having a low boiling temperature and the other a higher boiling temperature, said heat pump comprising:
   a.) a pressure vessel containing said working medium and having at least first and second compartments;
   b.) heat transfer means for controlling the temperature of said compartments to cause an absorption heat cycle of boiling, condensing, evaporating and absorbing to occur, said boiling and absorbing steps occurring sequentially in said first compartment and said condensing and evaporating steps occurring sequentially in said second compartment;
   c.) means for periodically withdrawing one of said substances from one of said compartments and transferring same to the other one of said compartments; and
   d.) means providing generally unrestricted, open fluid communication between said first and second compartments whereby said pressure in said first and second compartments are virtually the same.

2. The heat pump of claim 1 wherein said withdrawal means is separate from said heat transfer means and is effective to withdraw said working medium from one of said compartments and transferring said withdrawn substance to the other one of said compartments.

3. The heat pump of claim 1 wherein said heat transfer means includes varying the temperature of said compartments to cause boiling and absorption in said first compartment and condensing and evaporation in said second compartment and said withdrawal means is effective to withdraw said lower boiling substance from said second compartment and return same to said first compartment.

4. The heat pump of claim 1 further including means for thermally insulating one compartment from the other.

5. The heat pump of claim 1 wherein said working medium is a mixture of ammonia and water.

6. The heat pump of claim 1 wherein said heat transfer means includes a heat transfer medium other than said working medium, and means for cyclically changing the temperature of said heat transfer medium.

7. The heat pump of claim 6 wherein said heat transfer means alternates the heat transfer medium between three temperature levels.

8. The heat pump of claim 1 wherein said means for withdrawing includes an externally actuated and energized pump.

9. The heat pump of claim 1 wherein said means for withdrawal includes an external valve actuator hermetically sealed from said pressure vessel.

10. A heat pump system for transferring heat by means of an absorption cycle sequentially boiling, condensing, evaporating and absorbing a working liquid medium of at least two compounds, one of said compounds or it's mixture having a higher boiling temperature than the other, said system comprising:
   a single, hermetically sealable, pressure vessel containing said working medium for performing all the stages of said cycle, said vessel having a first compartment containing one or both of said compounds throughout said cycle and a second compartment containing either, generally, none or only said lower boiling temperature compound throughout said cycle, and means for maintaining fluid communication between said first and second compartments at generally the same pressures;
   heat transfer means for cyclically controlling the temperature of said compartments during said cycle independently of one another to cause said working medium in said vessel to undergo said absorption cycle; and
   said heat transfer means further includes a heat transfer medium in contact with the exterior surfaces of said first and second compartments, heat exchange means for maintaining said heat transfer medium within first, second and third temperature ranges, and valuing means for cycling said heat transfer medium at selected temperature ranges into contact with one of said compartments for causing said absorption cycle to occur.

11. An absorption heat pump using a working medium of at least two substances, one substance having a higher boiling temperature than the other substance, said heat pump comprising:
   a.) a pressure vessel containing said working medium and having at least two compartments, said first and second compartments in unrestricted, open fluid communication with one another;
   b.) heat transfer means for controlling the temperature of said compartments to cause an absorption heat cycle of boiling, condensing, evaporating and absorbing to occur, said boiling and absorbing sequentially occurring in one of said compartments while said condensing and evaporating sequentially occur in the other one of said compartments; said heat transfer means for controlling temperature including means to rotate said compartments about a common axis; and
   c.) means for periodically withdrawing, one of said working substances from one of said compartments and transferring same to the other one of said compartments.

12. The heat pump of claim 11 wherein said withdrawal means is separate from said heat transfer means and is effective to withdraw said working medium from one of said compartments and transferring said withdrawn substance to the other one of said compartments.

13. The heat pump of claim 11 wherein said heat transfer means includes varying the temperature of said compartments to cause boiling and absorption in said first compartment and condensing and evaporation in said second compartment and said withdrawal means is effective to withdraw said lower boiling substance from said second compartment and return same to said first compartment.

14. The heat pump of claim 11 further including means for thermally insulating one compartment from the other.

15. The heat pump of claim 11 wherein said working medium is a mixture of ammonia and water.

16. The heat pump of claim 11 wherein said heat transfer means includes a heat transfer medium other than said working medium, and means for cyclically changing the temperature of said heat transfer medium.

17. The heat pump of claim 16 wherein said heat transfer means alternates the heat transfer medium between three temperature levels.

18. The heat pump of claim 11 wherein said withdrawal means includes a valve.

19. The heat pump of claim 18 further including an actuator external to and hermetically sealed from said pressure vessel for actuating said valve.

20. The heat pump of claim 11 wherein said withdrawal means includes a pump.

21. The heat pump of claim 19 further including a motor and coupling means between said motor and said pump for driving said pump, said motor and said coupling means external to and hermetically sealed from said pressure vessel.

22. An absorption heat pump using a working medium of at least two substances, one substance having a higher boiling temperature than the other, said heat pump comprising:
   a.) a pressure vessel containing said working medium having two compartments, said compartments having a common axis of rotation and said vessel having the general shape of a dumb-bell;
   b.) heat transfer means for controlling the temperatures of said compartment to cause a heat absorption cycle to occur in said pressure vessel;
   c.) means for periodically withdrawing one of said substances from one of said compartments and returning same to the other one of said compartments; and
   d.) said heat transfer means includes varying the temperature of said compartments to cause boiling and absorption in said first compartment and condensing and evaporation in said second compartment and said withdrawal means is effective to withdraw said lower boiling substance from said second compartment and return same to said first compartment.

23. The heat pump of claim 22 wherein said means for withdrawing is separate and apart from said heat transfer means.

24. The heat pump of claim 22 further including means for thermally insulating one compartment from the other.

25. An absorption heat pump using a working medium of at least two substances, one substance having a higher boiling temperature than the other, said heat pump comprising:
   a.) a pressure vessel containing said working medium having two compartments, said compartments having a common axis of rotation and said vessel having the general shape of a dumb-bell;
   b.) heat transfer means for controlling the temperatures of said compartment to cause a heat absorption cycle to occur in said pressure vessel;
   c.) means for periodically withdrawing one of said substances from one of said compartments and returning same to the other one of said compartments; and
   d.) said working medium includes ammonia and water and the total volume of said working medium, in a liquid state, is not more than about fifty (50) percent of the volume of the largest one of said compartments.

26. An absorption heat pump using a working medium of at least two substances, one substance having a higher boiling temperature than the other, said heat pump comprising:
   a.) a pressure vessel containing said working medium having two compartments, said compartments having a common axis of rotation and said vessel having the general shape of a dumb-bell;
   b.) heat transfer means for controlling the temperatures of said compartment to cause a heat absorption cycle to occur in said pressure vessel;
   c.) means for periodically withdrawing one of said substances from one of said compartments and returning same to the other one of said compartments; and
   d.) said heat transfer means includes a heat transfer medium other than said medium in contact with the exterior of said compartments, said heat transfer means effective to cyclically change the temperature of said heat transfer medium.

27. The heat pump of claim 26 wherein said heat transfer means is effective to change the temperature of said heat transfer medium between three discrete temperature ranges.

28. An absorption heat pump using a working medium of at least two substances, one substance having a higher boiling temperature than the other, said heat pump comprising:
a.) a pressure vessel containing said working medium having two compartments, said compartments having a common axis of rotation and said vessel having the general shape of a dumb-bell;
b.) heat transfer means for controlling the temperatures of said compartment to cause a heat absorption cycle to occur in said pressure vessel;
c.) means for periodically withdrawing one of said substances from one of said compartments and returning same to the other one of said compartments; and
d.) said withdrawing means includes a tube extending as a dipstick into one of said compartments.

29. The heat pump of claim 28 wherein said withdrawing means is effective to withdraw said one of said substances from one of said compartments when said one of said compartments is rotated less than a predetermined rotational speed.

30. The heat pump of claim 26 wherein said heat transfer means includes a plurality of valves for cycling heat transfer medium at predetermined temperatures into external contact with said compartments.

31. The heat pump of claim 30 wherein said valves are four-way valves.

32. An absorption heat pump using a working medium of at least two substances, one substance having a higher boiling temperature than the other, said heat pump comprising:
a.) a pressure vessel containing said working medium having two compartments, said compartments having a common axis of rotation and said vessel having the general shape of a dumb-bell;
b.) heat transfer means for controlling the temperatures of said compartment to cause a heat absorption cycle to occur in said pressure vessel;
c.) means for periodically withdrawing one of said substances from one of said compartments and returning same to the other one of said compartments; and
d.) electric motor means for rotating said compartments about said common axis.

33. The system of claim 10 wherein said heat transfer means further includes a heat transfer medium in contact with the exterior surfaces of said first and second compartments, heat exchange means for maintaining said heat transfer medium within first, second and third temperature ranges, and valving means for periodically cycling said heat transfer medium at selected temperature ranges into contact with one of said compartments for causing said absorption cycle to occur.

34. A heat pump system for transferring heat by means of an absorption cycle sequentially boiling, condensing, evaporating and absorbing a working liquid medium of at least two compounds, one of said compounds or it's mixture having a higher boiling temperature than the other, said system comprising:
a single, hermetically sealable, pressure vessel containing said working medium for performing all the stages of said cycle, said vessel having a first compartment containing one or both of said compounds throughout said cycle and a second compartment containing either, generally, none or only said lower boiling temperature compound throughout said cycle, and means for maintaining fluid communication between said first and second compartments at generally the same pressures;
heat transfer means for cyclically controlling the temperature of said compartments during said cycle independently of one another to cause said working medium in said vessel to undergo said absorption cycle; and
said vessel is in the general configuration of a dumb-bell with said first and second compartments interconnected by a communicating tube sufficiently large in diameter to prevent significant pressure drop therethrough at the pressures at which said compartments are subjected to.

35. The system of claim 33 wherein said vessel is in the general configuration of a dumb-bell with said first and second compartments interconnected by a communicating tube sufficiently large in diameter to prevent significant pressure drop therethrough at the pressures at which said compartments are subjected to.

36. The system of claim 35 wherein a second vessel is provided, said heat transfer means effective to cause said second vessel to evaporate said low boiling temperature liquid from said second compartment while said first vessel is boiling said low boiling temperature liquid from its first compartment whereby continuous cooling or heating occurs.

37. The hydronic system of claim 34 wherein said heat transfer medium is a liquid with low freezing point, said system further including a first heat transfer container filled with said hydronic liquid and containing said first compartment immersed therein, and a second heat transfer container filled with said hydronic liquid containing said second compartment immersed therein, and means for rotating said compartments within said heat transfer containers for causing effective heat transfer between said heat transfer medium and said working medium while causing said low boiling temperature compound to be readily absorbed into said high boiling temperature compound when said low boiling temperature compound is evaporated as a vapor from said second compartment.

38. The system of claim 35 wherein said heat transfer medium is a hydronic liquid, with a low freezing point, said system further including a first heat transfer container filled with said hydronic liquid and containing said first compartment immersed therein, and a second heat transfer container filled with said hydronic liquid containing said second compartment immersed therein, and means for rotating said compartments within said heat transfer containers for causing effective heat transfer between said heat transfer medium and said working medium while causing said low boiling temperature compound to be readily absorbed into said high boiling temperature compound when said low boiling temperature compound is evaporated as a vapor from said second compartment.

39. The system of claim 37 wherein said heat transfer medium includes first, second and third heat transfer mediums, heat source means sufficient to maintain said first heat transfer medium at said first temperature, first heat exchange means sufficient to maintain said second heat transfer medium at said second temperature range and second heat exchange means sufficient to maintain said third heat transfer medium at said third temperature range, said valving means providing fluid communication of selected first, second and third heat transfer mediums with selected first and second heat transfer container to cause said absorption cycle to occur.

40. The system of claim 38 wherein said heat transfer medium includes first, second and third heat transfer mediums, heat source means sufficient to maintain said first heat transfer medium at said first temperature, first heat exchange means sufficient to maintain said second heat transfer medium at said second temperature range and second heat exchange means sufficient to maintain said third heat transfer medium at said third temperature range, said valving means providing fluid communication of selected first, second and third heat transfer mediums with selected first and second heat transfer container to cause said absorption cycle to occur.

41. The system of claim 39 wherein said first heat exchange means includes an outside heat exchanger effective to exchange heat with ambient temperature and said second heat exchange means includes an in-duct heat exchanger situated within a structure whereby cooling of said structure occurs.

42. The system of claim 39 wherein said second heat exchange means includes an outside heat exchanger effective to exchange heat with ambient temperature and said first heat exchange means includes an in-duct heat exchanger situated within a structure whereby heating of said structure occurs.

43. The system of claim 41 wherein said valving means includes means to switch said second heat transfer medium to said in-duct heat exchanger and said third heat transfer medium to said outside heat exchanger whereby heating and cooling of said structure may be selectively alternated upon actuation of said valving means.

44. The system of claim 36 wherein said heat transfer medium includes first, second and third heat transfer mediums, heat source means sufficient to maintain said first heat transfer medium at said first temperature, first heat exchange means sufficient to maintain said second heat transfer medium at said second temperature range and second heat exchange means sufficient to maintain said third heat transfer medium at said third temperature range, said valving means providing fluid communication of selected first, second and third heat transfer mediums with selected first and second heat transfer container to cause said absorption cycle to occur.

45. The system of claim 44 wherein said first heat exchange means includes an outside heat exchanger effective to exchange heat with ambient temperature, said second heat exchange means includes an in-duct heat exchanger situated within a structure to be heated or cooled.

46. The system of claim 45 wherein said valving means is effective to cause said first heat transfer medium to be in fluid communication with said first container of said first vessel when said second heat transfer medium flowing through said external heat exchanger is in fluid communication with said second container of said first vessel and simultaneously in fluid communication with said first container of said second vessel while said third transfer medium is in fluid communication with said second container of said second vessel and said valving means is effective at a predetermined time to switch said heat transfer medium so that said first heat transfer medium is in fluid communication with said first container of said second vessel when said second heat transfer medium flowing through said external heat exchanger is in fluid communication with said first container of said first vessel and simultaneously in fluid communication with said second container of said second vessel while said third heat transfer medium flowing through said in-duct heat exchanger is in fluid communication with said second container in said first vessel whereby cooling of the structure containing said in-duct heat exchanger occurs.

47. The system of claim 46 wherein said cooling means is effective to cause said second heat transfer medium to flow through said in-duct heat exchanger and said third heat transfer medium to flow through said outside heat exchanger whereby heating of the structure containing said in-duct heat exchanger occurs.

48. The heat pump system of claim 34 further including means to periodically withdraw from said second compartment any working medium or compound thereof therein and return said working medium or compound thereof to said first compartment.

49. A heat pump system for transferring heat by means of an absorption cycle sequentially boiling, condensing, evaporating and absorbing a working liquid medium of at least two compounds, one of said compounds or it's mixture having a higher boiling temperature than the other, said system comprising:

a.) a single, hermetically sealable, pressure vessel containing said working medium for performing all the stages of said cycle, said vessel having a first compartment containing one or both of said compounds throughout said cycle and a second compartment containing either, generally, none or only said lower boiling temperature compound throughout said cycle, and means for maintaining fluid communication between said first and second compartments at generally the same pressures;

b.) heat transfer means for cyclically controlling the temperature of said compartments during said cycle independently of one another to cause said working medium in said vessel to undergo said absorption cycle;

c.) means to periodically withdraw from said second compartment any working medium or compound thereof therein and return said working medium or compound thereof to said first compartment; and d.) said heat transfer means includes means for inputting heat to said first compartment at a first temperature range sufficient to cause boiling of said higher vapor pressure liquid and condensing means for absorbing heat from said second compartment at a second temperature range sufficient to cause vapor of said lower boiling temperature compound to condense therein, said fluid communication means maintaining said first and second compartments at approximately the same pressure while said lower boiling temperature compound is boiled in said first compartment and condensed in said second compartment.

50. The system of claim 49 wherein said heat transfer means further includes evaporator means for inputting heat to said second compartment at a third temperature range sufficient to cause said low boiling temperature compound to evaporate therefrom and absorbing means for absorbing heat from said first compartment at said second temperature range to cause said low boiling temperature compound to be absorbed by the high boiling temperature compound, said fluid communication means maintaining said first and second compartments at virtually the same pressures while said low boiling temperature compound is evaporated from said second compartment and absorbed in said first compartment.

51. The heat pump of claim 2 further including means in said first compartment to expose said working medium in said first compartment to the vapors in said first and second compartments.

52. The heat pump of claim 32 wherein said electric motor means includes an electric motor and timer means for cyclically actuating and varying the speed of said electric motor.

53. A method for performing an absorption heat cycle using a working medium for heating and/or cooling comprising the steps of:
 a.) providing a pressure vessel having first and second compartments in unrestricted fluid communication with one another so that both compartments are at generally equal pressures throughout said cycle;
 b.) providing within said pressure vessel a working medium having first and second liquid substances, one substance having a lower boiling temperature than the other;
 c.) changing the temperature of said first and second compartments to simultaneously cause boiling of said low boiling temperature substance in said first compartment and condensation of said low boiling temperature substance in said second compartment; and thereafter
 d.) further changing the temperature of said first and second compartments to simultaneously cause evaporation of said low boiling temperature substance liquid from said second compartment and absorption of said low boiling temperature substance in said high boiling temperature substance in said first compartment whereby said absorption cycle is caused to occur in a batch processing mode having two distinct phases.

54. The method of claim 53 further including the step of periodically removing at least said high boiling temperature substance from said second compartment and returning same to said first compartment.

55. The method of claim 54 further including in step (c) inputting heat into said first compartment to maintain the temperature of said first compartment within a first temperature range while absorbing heat from said second compartment to maintain said second compartment within a second temperature range.

56. The method of claim 55 further including in step (d) the step of inputting heat into said second compartment to maintain said second compartment at a third temperature range while absorbing heat from said first compartment to maintain said first compartment at said second temperature range.

57. The method of claim 53 further including in step (c) inputting heat into said first compartment to maintain the temperature of said first compartment within a first temperature range while absorbing heat from said second compartment to maintain said second compartment within a second temperature range.

58. The method of claim 57 further including in step (d) the step of inputting heat into said second compartment to maintain said second compartment at a third temperature range while absorbing heat from said first compartment to maintain said first compartment at said second temperature range.

59. The method of claim 56 further including in step (c), providing a first heat transfer medium at said first temperature range in contact with the exterior of said first compartment for effecting heat transfer with said working medium in said first compartment and inputting heat to said first transfer medium at least sufficient to make up heat absorbed by said working substance in said first compartment when said low boiling temperature substance vaporizes.

60. The method of claim 59 further including in step (c), providing a second heat transfer medium at said second temperature range in contact with the exterior of said second compartment to effect heat transfer with said second compartment and removing heat from said second heat transfer medium approximately equal to that given off by said low boiling temperature substance in said second compartment when said low boiling temperature substance substantially condenses to liquid in said second compartment.

61. The method of claim 60 further including in step (d), providing a third heat transfer medium at said third temperature range in contact with the exterior of said second compartment and inputting heat to said third heat transfer medium approximately equal to that absorbed by said low boiling temperature substance in said second compartment when said low boiling temperature substance evaporates from said second compartment.

62. The method of claim 61 further including in step (d), providing said second heat transfer medium at said second temperature range in contact with the exterior said first compartment to effect heat transfer with said working medium in said first compartment and removing heat from said second heat transfer medium approximately equal to that given off by said low boiling temperature substance in said first compartment when said low boiling temperature substance is absorbed by said high boiling temperature substance.

63. The method of claim 62 further including the step of rotating said first and second compartments relative to said heat transfer medium to increase the heat transfer rate between said compartments and said heat transfer medium while simultaneously causing said low boiling temperature substance to be readily absorbed into said high boiling temperature substance during the absorption phase of said absorption cycle.

64. The method of claim 63 wherein said compartments rotate about a common axis and an open ended transfer tube extends along said axis of rotation from said first compartment to said second compartment and within said second compartment, said transfer tube extends radially from said axis of rotation to a position adjacent the interior surface of said second compartment, said method further including the steps of rotating said compartments during said cycle at rotational speeds sufficiently high to prevent said working medium from flowing through said transfer tube from said second compartment to said first compartment.

65. The method of claim 64 further including the step of periodically reducing the speed of rotation of said compartments to a rotational speed sufficiently slow to permit said working medium, by the force of gravity, to enter said transfer tube in said second compartment and travel therethrough into said first compartment whereby said second compartment is periodically cleansed of said high boiling temperature substance.

66. The method of claim 61 wherein said first temperature is in excess of about 200° F. to about 350° F., said second temperature range is an ambient temperature range of between about 68° F. to 120° F. and said third temperature range is between about 15° F. to 45° F.

67. The method of claim 65 wherein said slower rotational speed occurs at the end of said absorption phase of said cycle after a predetermined number of cycles have occurred.

68. The method of claim 54 wherein said low boiling temperature substance is ammonia and said high boiling temperature substance is water.

69. The method of claim 68 wherein the ammonia comprises between about 40-60% by weight of said working medium.

70. The method of claim 69 wherein the temperature to cause boiling of said ammonia does not exceed about 250° F. when the temperature to cause condensing is between about 60° F. to 120° F. whereby effective cooling of a residential home can readily occur.

71. The method of claim 53 wherein said low boiling temperature substance is water and said high boiling temperature substance is lithium chloride.

72. The method of claim 70 wherein the pressure within said compartments is between about 25 psia to about 250 psia during said cycle at said temperature ranges.

73. The method of claim 72 wherein said working substance by volume equals about one-half the volume of the largest one of said compartments and is hermetically sealed within said vessel.

74. The method of claim 61 wherein said third heat transfer medium is a water-glycol solution.

75. The method of claim 74 wherein said second heat transfer medium is a water-glycol solution.

76. The method of claim 74 wherein said second heat transfer medium is air.

77. The method of claim 54 further including the steps of providing a second pressure vessel and operating said absorption cycle for said second vessel so that the absorption-evaporation phases occur in said second vessel when and as said boiling-condensing phases occur in said first vessel whereby said method continuously provides heating and cooling.

78. The method of claim 77 further including the steps of using said first, second and third heat transfer mediums with both of said first and second vessels.

79. The method of claim 62 further including the step of providing an external heat exchanger and exchanging heat with said second heat transfer medium in said external heat exchanger to maintain the temperature range of said second heat transfer medium and providing an in-duct heat exchanger and exchanging heat with said third heat transfer medium in said in-duct heat exchanger to maintain the temperature of said third heat transfer medium whereby said absorption cycle is effective to cool a structure containing said in-duct heat exchanger.

80. The method of claim 79 further including the step of providing valves in fluid communication with said second and third heat transfer mediums and said external and in-duct heat exchangers and switching said valves such that said third heat transfer medium is in fluid communication with said external heat exchanger and said second heat transfer medium is in communication with said in-duct heat exchanger whereby a structure containing said in-duct heat exchanger is heated.

81. A method of heating and cooling comprising the steps of:
a.) providing a pressure vessel having first and second compartments in fluid communication with one another and a working medium within said vessel of at least two liquid substances, one substance having a lower boiling temperature than the other;
b.) transferring heat to said first compartment and from said second compartment to maintain said first compartment at a first predetermined temperature range and said second compartment at a second lower predetermined temperature range while maintaining said first and second compartments at approximately equal pressures, said first and second temperatures established at values sufficient to cause said higher vapor pressure substance in said first compartment to vaporize, travel to said second compartment and condense to substantially liquid form thereat;
c.) subsequently transferring heat from said first compartment and to said second compartment to maintain said second compartment at a third predetermined temperature range lower than said second temperature range and said first compartment at said second temperature range while maintaining said first and second compartments at approximately equal pressures, said second and third temperature ranges being established at values sufficient to cause said low boiling temperature substance in said second compartment to evaporate, travel to said first compartment and be absorbed in said high boiling temperature substance in said first compartment; and
d ) repeating, cyclically, steps (a) and (b).

82. The method of claim 81 further including the step of mechanically withdrawing said substance from said second compartment to said first compartment at periodic intervals.

83. The method of claim 82 wherein said low boiling temperature substance is ammonia and said high boiling temperature substance is water.

84. The method of claim 82 wherein said low boiling temperature is water and said high boiling temperature substance is a salt such as lithium chloride or lithium bromide.

85. The method of claim 82 wherein step (c) continues until a predetermined mixture of ammonia and water is present in said first compartment.

86. The method of claim 85 wherein said ammonia-water ratio is generally between about 40-60% of ammonia by weight.

87. The method of claim 86 wherein said first temperature range does not exceed about 250° F. and said second temperature is between about 60° F. to 120° F.

88. The method of claim 82 wherein said pressure does not exceed about 250 psia.

89. The method of claim 89 further including the steps of providing a first heat transfer medium at said first temperature range in contact with the exterior of said first compartment for effecting heat transfer with said working medium in said first compartment and inputting heat to said first transfer medium at least sufficient to make up heat absorbed by said working substance in said first compartment when said low boiling temperature liquid vaporizes.

90. The method of claim 89 further including the step of providing a second heat transfer medium at said second temperature range in contact with the exterior of said second compartment to effect heat transfer with said second compartment and removing heat from said second heat transfer medium to make up heat given off by said low boiling temperature substance in said second compartment when said low boiling temperature substance vapors substantially condense to liquid in said second compartment.

91. The method of claim 90 further including the step of providing a third heat transfer medium at said third temperature range in contact with the exterior of said second compartment and inputting heat from said third heat transfer medium to said second compartment to provide heat to said low boiling temperature substance in said second compartment when said low boiling temperature substance evaporates.

92. The method of claim 91 further including the step of providing said second heat transfer medium at said second temperature range in contact with the exterior of said first compartment to effect heat transfer with said working medium in said first compartment and removing heat from said second heat transfer medium to make up heat given off by said low boiling temperature substance in said first compartment when said low boiling temperature liquid vapor is absorbed by said high boiling temperature substance.

93. The method of claim 82 further including the steps of providing first and second containers for said first and second compartments, respectively, selectively containing said heat transfer medium at said temperature ranges and rotating said first and second compartments within said containers to increase the heat transfer rate between said compartments and said heat transfer medium while simultaneously causing vapors of said low boiling temperature substance to be readily absorbed into said high boiling temperature substance during the absorption phase of said cycle.

94. The method of claim 93 wherein said compartments rotate about a common axis and an open ended transfer tube extends along said axis of rotation from said first compartment to said second compartment and within said second compartment extends radially from said axis of rotation to a position adjacent the interior surface of said second compartment, said method further including the step of rotating said compartments during said cycle at rotational speeds sufficiently high to prevent said substances from flowing through said transfer tube from said second compartment to said first compartment.

95. The method of claim 94 further including the step of periodically reducing the speed of rotation of said compartments to a rotational speed sufficiently slow to permit said substances, by the force of gravity, to enter said transfer tube in said second compartment and travel therethrough into said first compartment whereby said second compartment is periodically cleansed of said high boiling temperature substance.

96. The method of claim 95 wherein said slower speed periodically occurs at a frequency which prevents the concentration of said ammonia in said water at the end of said evaporation stage in said second compartment from approaching approximately a concentration close to that in said first compartment.

97. The method of claim 82 further including the steps of providing a second pressure vessel and operating said absorption cycle for said second vessel so that the absorption-evaporation phase occurs in said second vessel when and as said boiling-condensing phase occurs in said first vessel whereby said method continuously provides heating and cooling.

98. The method of claim 97 further including the steps of using said first, second and third heat transfer mediums with both of said vessels.

99. The method of claim 92 further including the step of providing an external heat exchanger and exchanging heat with said second heat transfer medium in said external heat exchanger to maintain the temperature range of said second heat transfer medium and providing an in-duct heat exchanger and exchanging heat with said third heat transfer medium in said in-duct heat exchanger to maintain the temperature of said third heat transfer medium whereby a structure containing said in-duct heat exchanger is cooled.

100. The method of claim 99 further including the step of providing valves in fluid communication with said second and third heat transfer mediums and said external and in-duct heat exchangers and operating said valves such that said third heat transfer medium is in fluid communication with said external heat exchanger and said second heat transfer medium is in communication with said in-duct heat exchanger whereby a structure containing said in-duct heat exchanger is heated.

101. An absorbent heat pump for residential heating and/or air conditioning comprising:
a pressure vessel having first and second compartments and means maintaining said compartments in fluid communication with one another at generally equal pressures;
a working medium within said vessel having at least two working liquid substances, one substance having a lower boiling temperature than the other;
first and second containers receiving and enclosing said first and second compartments respectively, each container filled with a heat transfer medium and pump means for causing said heat transfer medium to flow into each container, contact the exterior surface of said compartment contained therein and flow out of said container;
means to cyclically change the temperature of said heat transfer medium to cause said vessel to boil and condense said low boiling temperature substance in a first stage followed by evaporating and absorbing said low boiling temperature substance in a second stage; and
means to periodically withdraw any substance from second compartment and return same to said first compartment.

102. The heat pump of claim 101 wherein said cyclical means maintains said heat transfer medium at three discrete temperature ranges including a first temperature range sufficient to cause said low boiling temperature substance to boil, a second temperature range equivalent to ambient temperature causing said low boiling point substance to be absorbed into said working medium and to condense, and a third temperature range equivalent to cooling temperature and causing said low boiling temperature substance to evaporate.

103. The heat pump of claim 102 wherein said heat transfer medium includes first, second and third heat transfer mediums, heat source means sufficient to maintain said first heat transfer medium at said first temperature, first heat exchange means sufficient to maintain said second heat transfer medium at said second temperature range and second heat exchange means sufficient to maintain said third heat transfer medium at said third temperature range, said valving means providing fluid communication of selected first, second and third heat transfer mediums with selected first and second heat transfer container to cause said absorption cycle to occur.

104. The heat pump of claim 103 wherein said second heat exchange means includes an outside heat exchanger in fluid communication with said second heat transfer medium and said third heat exchange means includes an in-duct heat exchanger in fluid communication with said third heat transfer medium, said in-duct heat exchanger situated within a dwelling for cooling thereof.

105. The heat pump of claim 104 further including valving means for switching said second heat transfer medium to said in-duct heat exchanger and said third heat transfer medium to said external heat exchanger for heating said dwelling.

106. The heat pump of claim 105 further including a second pressure vessel generally identical to said first vessel said means to cyclically change the temperature effective to cause one of said vessels to be in a first stage while the other vessel is in a second stage whereby continuous cooling or heating occurs.

107. The heat pump of claim 101 wherein said vessel is in the general configuration of a dumb-bell with said first and second compartments interconnected by a communicating tube sufficiently large in diameter to prevent significant pressure drop therethrough at the pressures at which said compartments are subjected to.

108. The heat pump of claim 107 wherein said means for periodically withdrawing including an open ended transfer tube within said communicating tube, said transfer tube having one open end adjacent said first compartment and its opposite end adjacent the interior surface of said second compartment, said transfer tube extending radially within said second compartment from said communicating tube to said opposite end and means to rotate said vessel about an axis extending through said communicating tube at high speeds when the absorption cycle occurs and at low speed when said substances are to be transferred from said second compartment to said first compartment.

109. The heat pump of claim 101 wherein said low boiling point substance is water and said high boiling point substance is a salt.

* * * * *